(12) United States Patent
Chuang et al.

(10) Patent No.: US 10,718,944 B2
(45) Date of Patent: Jul. 21, 2020

(54) NEAR-EYE DISPLAY DEVICE WITH PHASE MODULATION

(71) Applicant: Coretronic Corporation, Hsin-Chu (TW)

(72) Inventors: Fu-Ming Chuang, Hsin-Chu (TW); Yi-Pai Huang, Hsin-Chu (TW); Jui-Yi Wu, Hsin-Chu (TW); Chuan-Chung Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 115 days.

(21) Appl. No.: 15/821,847

(22) Filed: Nov. 24, 2017

(65) Prior Publication Data

US 2018/0149871 A1 May 31, 2018

(30) Foreign Application Priority Data

Nov. 25, 2016 (CN) .......................... 2016 1 1050651

(51) Int. Cl.
*G02B 27/01* (2006.01)
*G02F 1/1335* (2006.01)
(Continued)

(52) U.S. Cl.
CPC ....... *G02B 27/0172* (2013.01); *G02F 1/1335* (2013.01); *G02F 1/133524* (2013.01);
(Continued)

(58) Field of Classification Search
CPC ........ G02B 27/0172; G02B 2027/0147; G02B 3/0056; G02B 2027/0178;
(Continued)

(56) References Cited

U.S. PATENT DOCUMENTS 6,222,627 B1   4/2001   Seitz et al.
6,919,982 B2   7/2005   Nimura et al.
(Continued)

FOREIGN PATENT DOCUMENTS

CN   103885181   6/2014
CN   104777622   7/2015
(Continued)

OTHER PUBLICATIONS

"Search Report of Europe Counterpart Application", dated Jul. 24, 2019, p. 1-p. 11.
(Continued)

*Primary Examiner* — Huyen L Ngo
(74) *Attorney, Agent, or Firm* — JCIPRNET

(57) ABSTRACT

A near-eye display device including a display panel, a liquid crystal layer, and a lens element is provided. The liquid crystal layer is disposed adjacent to the display panel and disposed between the display panel and the lens element. The display panel is configured to provide an image light beam to pass through the liquid crystal layer. At least a portion of the liquid crystal layer is configured to modulate the image light beam according to the phase modulation. Phase modulation occurs to at least a portion of the liquid crystal layer to modulate the image light beam, and the lens element is a micro lens array.

17 Claims, 16 Drawing Sheets

(51) Int. Cl.

| | | |
|---|---|---|
| G02B 3/00 | (2006.01) | |
| G02F 1/29 | (2006.01) | |
| G02B 5/04 | (2006.01) | |
| G09G 3/36 | (2006.01) | |

(52) U.S. Cl.
CPC ...... *G02F 1/133526* (2013.01); *G02B 3/0056* (2013.01); *G02B 5/045* (2013.01); *G02B 2027/014* (2013.01); *G02B 2027/0147* (2013.01); *G02B 2027/0178* (2013.01); *G02F 2001/133565* (2013.01); *G02F 2001/294* (2013.01); *G02F 2203/12* (2013.01); *G02F 2203/50* (2013.01); *G09G 3/36* (2013.01); *G09G 2340/0407* (2013.01); *G09G 2340/0464* (2013.01)

(58) Field of Classification Search
CPC .............. G02B 2027/014; G02B 5/045; G02B 27/0101; G02F 1/133524; G02F 1/133526; G02F 1/1335; G02F 2001/133565; G02F 2001/294; G02F 2203/50; G02F 2203/12; G02F 1/29; G09G 2340/0464; G09G 2340/0407; G09G 3/36

See application file for complete search history.

(56) References Cited

U.S. PATENT DOCUMENTS

| | | | |
|---|---|---|---|
| 7,439,938 | B2 | 10/2008 | Cho et al. |
| 7,791,807 | B2 | 9/2010 | Pasca et al. |
| 8,842,064 | B2 | 9/2014 | Robinson |
| 2007/0097277 | A1 | 5/2007 | Hong et al. |
| 2010/0026920 | A1 | 2/2010 | Kim et al. |
| 2011/0032346 | A1* | 2/2011 | Kleinberger ......... H04N 13/305 348/59 |
| 2013/0021226 | A1 | 1/2013 | Bell |
| 2013/0250409 | A1* | 9/2013 | Otose ..................... G02B 30/27 359/463 |
| 2014/0071538 | A1 | 3/2014 | Muller |
| 2014/0347736 | A1* | 11/2014 | Liu .................. G02F 1/133351 359/630 |
| 2015/0036209 | A1 | 2/2015 | Ichihashi et al. |
| 2015/0262424 | A1 | 9/2015 | Tabaka et al. |
| 2016/0379606 | A1* | 12/2016 | Kollin ................ G02B 27/0093 345/428 |
| 2017/0227770 | A1* | 8/2017 | Carollo ................ G02B 27/142 |
| 2017/0227777 | A1* | 8/2017 | Carollo ............. G02B 27/0176 |
| 2018/0203205 | A1* | 7/2018 | Cao ..................... G02B 13/0035 |
| 2018/0246330 | A1* | 8/2018 | Fattal ................ G02B 27/0172 |
| 2019/0250439 | A1* | 8/2019 | Urey .................. G02B 27/0172 |
| 2019/0250456 | A1* | 8/2019 | Lo ..................... G02F 1/136277 |
| 2019/0353916 | A1* | 11/2019 | Koito ..................... G02B 30/27 |

FOREIGN PATENT DOCUMENTS

| | | |
|---|---|---|
| CN | 104820292 | 8/2015 |
| CN | 105589207 | 5/2016 |
| CN | 105629469 | 6/2016 |
| EP | 1197766 | 4/2002 |
| EP | 2631702 | 8/2013 |
| JP | 2011118168 | 6/2011 |
| TW | I448791 | 8/2014 |
| WO | 2009044334 | 4/2009 |
| WO | 2009122329 | 10/2009 |

OTHER PUBLICATIONS

Paul F McManamon et al., "A Review of Phased Array Steering for Narrow-Band Electrooptical Systems," Journals & Magazines, Proceedings of the IEEE, vol. 97, Issue 6, May 19, 2009, pp. 1078-1096.

Ki-Chul Kwon, et al., "Resolution-enhancement for an orthographic view image display in an integral imaging microscope system," Biomedical Optics Express, vol. 6, No. 3, Mar. 2015, pp. 736-746.

Tai-Hsiang Jen, et al., "Dynamic integral imaging display with electrically moving array lenslet technique using liquid crystal lens," Optics Express, vol. 23, No. 14, Jul. 2015, pp. 18415-18421.

Andrew Maimone, et al., "Computational Augmented Reality Eyeglasses," 2013 IEEE International Symposium on Mixed and Augmented Reality (ISMAR), Oct. 2013, pp. 1-11.

Xinda Hu, et al., "Design and tolerance of a free-form optical system for an optical see-through multi-focal-plane display," Applied Optics, vol. 54, No. 33, Nov. 2015, pp. 9990-9999.

Weitao Song, et al., "Design of light field head-mounted display," International Optical Design Conference, Jun. 2014, pp. 1-7.

Fu-Chung Huang, et al., "Eyeglasses-free Display: Towards Correcting Visual Aberrations with Computational Light Field Displays," ACM Transactions on Graphics (TOG), vol. 33, Issue 4, Jul. 2014, pp. 1-12.

Douglas Lanman, et al., "Near-Eye Light Field Displays," ACM Transactions on Graphics (TOG), vol. 32, Issue 6, Nov. 2013, pp. 1-10.

Kaan Aksit, et al., "Slim near-eye display using pinhole aperture arrays," Applied Optics, vol. 54, No. 11, Apr. 2015, pp. 3422-3427.

Hsin-Hsueh Lee, et al., "Resolution Enhanced 3D Light Field Microscope with Liquid Crystal Wedge," International Display Workshops, Dec. 2016, pp. 1-3.

"Search Report of Europe Counterpart Application", dated Apr. 18, 2018, p. 1-p. 7, in which the listed references were cited.

* cited by examiner

NEAR-EYE DISPLAY DEVICE WITH PHASE MODULATION

CROSS-REFERENCE TO RELATED APPLICATION

This application claims the priority benefit of China application serial no. 201611050651.7, filed on Nov. 25, 2016. The entirety of the above-mentioned patent application is hereby incorporated by reference herein and made a part of this specification.

BACKGROUND OF THE INVENTION

Field of the Invention

The invention relates to a display device, and more particularly, to a near-eye display device.

Description of Related Art

With the rapid development of the near-eye display (NED), to make the image seen by the user while wearing the NED more realistic and more comfortable, light field NED is developed. The difference between light field NED and traditional NED is that light field NED further has the advantage of significantly reducing the overall optical path length via the mechanism of light field image, such that light weight of NED can be achieved.

However, in the light field NED, in addition to providing two-dimensional image data, three-dimensional information of the desired display image light also needs to be provided, such that most light field NEDs have the issue of drastically reduced image resolution. Therefore, how to effectively increase the resolution of the existing light field NED or a general NED is one of the main concerns for those skilled in the art.

It should be mentioned that, "Description of Related Art" is only intended to allow for better understanding of the content of the invention, and therefore the content disclosed in the "Description of Related Art" may contain some known techniques not known to those having ordinary skill in the art. The content disclosed in "Description of Related Art" does not represent issues to be solved by the content or one or a plurality of embodiments of the invention, and is known or recognized by those having ordinary skill in the art prior to the application of the invention.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a near-eye display device having high resolution compared to existing near-eye display devices.

Other objects and advantages of the invention can be further understood from the technical features disclosed in the invention.

To achieve one or some or all of the objects or other objects, an embodiment of the invention provides a near-eye display device including a display panel, a liquid crystal layer, and a lens element. The display panel is configured to provide an image light beam. The liquid crystal layer is disposed adjacent to the display panel, and the image light beam passes through the liquid crystal layer. The liquid crystal layer is disposed between the display panel and the lens element. At least a portion of the liquid crystal layer modulates the image light beam according to phase modulation.

Based on the above, the embodiments of the invention have at least one of the following advantages or efficacies. In an embodiment of the invention, the liquid crystal layer of the near-eye display device is disposed adjacent to the display panel, and the liquid crystal layer is disposed between the display panel and the lens element. Moreover, the image light beam provided by the display panel passes through the liquid crystal layer, and phase modulation occurs to at least a portion of the liquid crystal layer to modulate the image light beam. Therefore, the liquid crystal layer can adjust the position of the image corresponding to the display panel via the modulation to the image light beam, such that the position of the adjusted image is displaced compared to the position of the image before adjustment. By continuously adjusting the position of the image via the liquid crystal layer at different time points, when the user sees the positions of the image before and after adjustment at different time points, the user sees an image having a high resolution formed by the image before adjustment and the image after adjustment. Therefore, the near-eye display device of an embodiment of the invention can have high resolution.

Other objectives, features and advantages of the invention will be further understood from the further technological features disclosed by the embodiments of the invention wherein there are shown and described preferred embodiments of this invention, simply by way of illustration of modes best suited to cam/out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
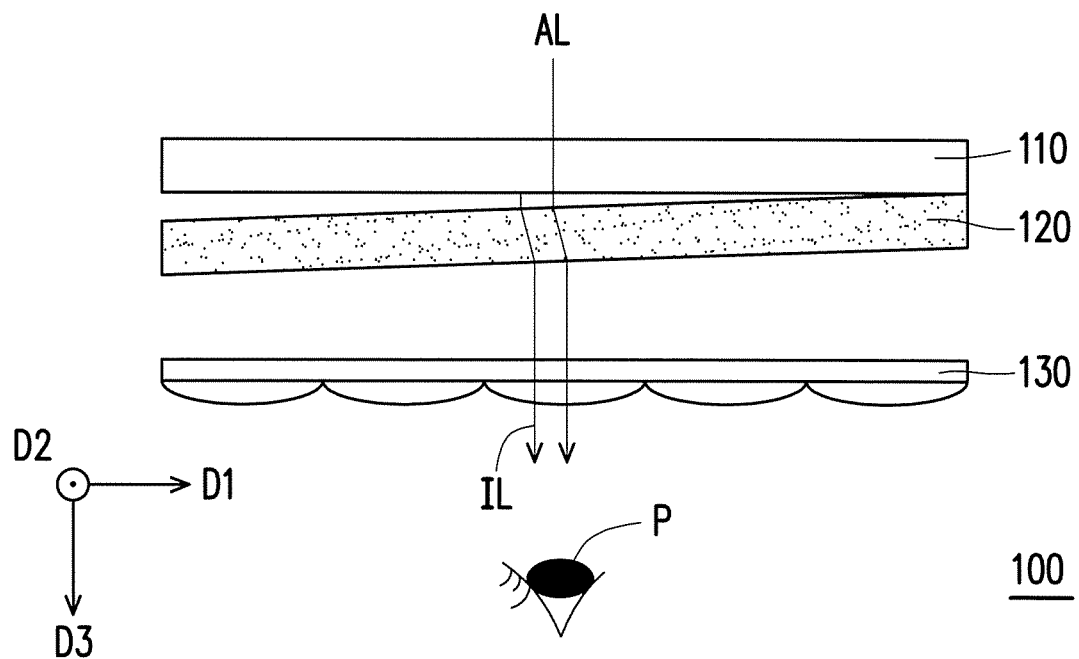
FIG. 1A shows a side view of the near-eye display device of an embodiment of the invention.

FIG. 1A shows a side view of the near-eye display device of an embodiment of the invention. Please refer to FIG. 1A. In the embodiment, a near-eye display device 100 includes a display panel 110, a liquid crystal layer 120, and a lens element 130. The liquid crystal layer 120 is disposed adjacent to the display panel 110, and the liquid crystal layer 120 is disposed between the display panel 110 and the lens element 130. The display panel 110 is configured to provide an image light beam IL (one image light beam IL is schematically shown in FIG. 1A, but the invention is not limited thereto), and the image light beam IL passes through the liquid crystal layer 120. In the invention, the liquid crystal layer 120 refers to an optical element that makes the liquid crystal layer 120 change the state of the light beam by applying voltage to or changing the voltage applied to the liquid crystal layer 120, such as a material that can change optical properties such as refractive index via a change in voltage, and the material is not particularly limited in the invention. Specifically, the image light beam IL passing through the liquid crystal layer 120 passes through the lens element 130, and the lens element 130 converges the image light beam IL to make the image light beam IL enter a pupil P, wherein the pupil P can be the pupil of a user's eye or an image capture device (such as a camera, a charge-coupled device (CCD), or other similar devices), and the invention is not limited thereto. After the image light beam IL passes through the pupil, the image light beam IL can form an image on the retina of the user's eye. However, in other embodiments, the pupil P can also be, for instance, the position of an aperture stop of a general optical lens. Specifically, the lens element 130 is, for instance, a micro lens array, and the near-eye display device 100 is, for instance, a near-eye light field display. The display panel 110 can be disposed with the lens element 130 and provide the image light beam IL having both two-dimensional information and three-dimensional information to achieve the display of light field image. However, in some embodiments, the lens element 130 can also be used as the ocular of the near-eye display device 100, such as a single lens, and the invention is not limited thereto.

In the embodiment, the display panel 110 is, for instance, a transparent display panel, and the image light beam IL passes through the liquid crystal layer 120 and the lens element 130 in order. Moreover, an external ambient light beam AL (one ambient light beam AL is schematically shown in FIG. 1A, but the invention is also not limited thereto) passes through the display panel 110, the liquid crystal layer 120, and the lens element 130 in order. Specifically, the image light beam IL can pass through the liquid crystal layer 120 and the lens element 130 and then enter the pupil P, and the ambient light beam AL can also pass through the transparent display panel 110, the liquid crystal layer 120, and the lens element 130 and then enter the pupil P. More specifically, the image light beam IL from the display panel 110 and the external ambient light beam AL can both enter the pupil P to form an image on the retina of the user's eye. Therefore, when the near-eye display device 100 is disposed in front of the user's eye and the image light beam IL and the ambient light beam AL both enter the pupil P of the user's eye, the user can see a virtual image (not shown) formed by the display screen corresponding to the image light beam IL. At the same time, the user can also see an external image (not shown) corresponding to the ambient light beam AL and achieve the display effect of augmented reality (AR). In the embodiment, the display panel 110 is, for instance, a transparent thin-film transistor-liquid crystal display (TFT-LCD), a transparent organic light-emitting diode (OLED) display, or other suitable types of transparent displays, and the invention is not limited thereto. Moreover, in some embodiments, the display panel 110 can also be an opaque display panel (such as a reflective liquid crystal panel or other suitable types of displays). At this point, the near-eye display device 100 can achieve the display effect of virtual reality (VR), and the invention is not limited thereto.

Figure 1B:
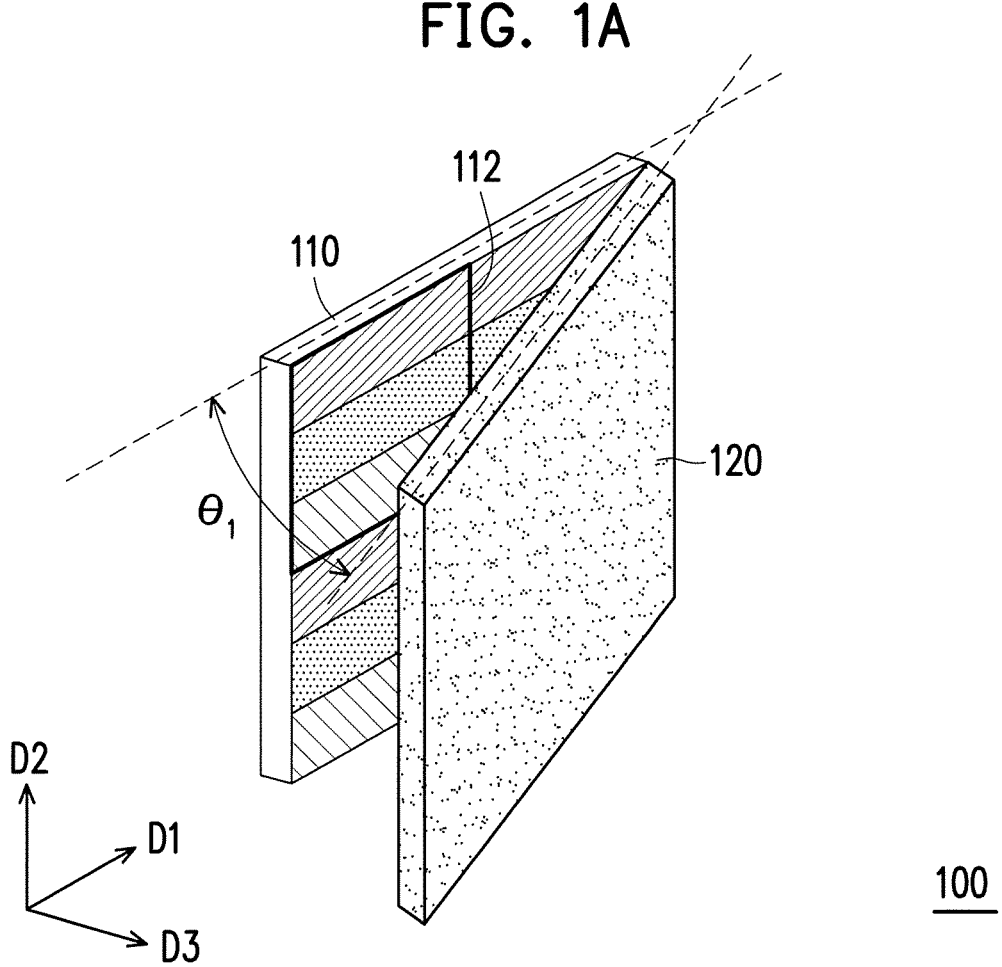
FIG. 1B shows a three-dimensional schematic of a liquid crystal layer disposed adjacent to a display panel of the embodiment of FIG. 1A.
Figure 1C:
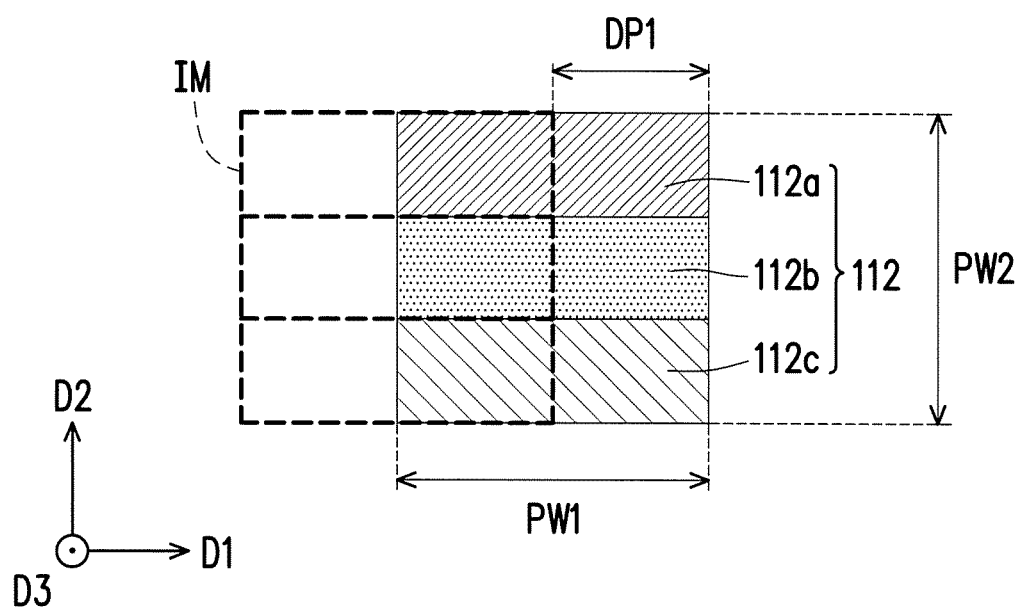
FIG. 1C shows the position of one pixel of a display panel and the position of the image adjusted by the liquid crystal layer of the embodiment of FIG. 1A.

FIG. 1B shows a schematic of a liquid crystal layer disposed adjacent to a display panel of the embodiment of FIG. 1A, and FIG. 1C shows the position of one pixel of the display panel and the position of the image adjusted by the liquid crystal layer of the embodiment of FIG. 1A. Referring first to FIG. 1B, the display panel 110 shown in FIG. 1B includes a plurality of pixels 112. To clearly show each of the pixels 112, FIG. 1B only exemplarily shows a portion of the display panel 110 and a portion of the liquid crystal layer 120, and therefore FIG. 1B only shows several pixels 112. However, the number of the pixels 112 actually included in the display panel 110 is not limited thereto. Moreover, the pixels 112 shown in FIG. 1C include, for instance, three sub-pixels (a sub-pixel 112a, a sub-pixel 112b, and a sub-pixel 112c), but in other embodiments, each of the pixels 112 of the display panel 110 can include other numbers of sub-pixels, and the colors of the sub-pixels contain, for instance, red, blue, and green, but the colors of the sub-pixels can be adjusted according to actual display requirements, and the invention is not limited thereto. Please refer to both FIG. 1A and FIG. 1B. In the embodiment, the near-eye display device 100 is, for instance, in the space formed by a first direction D1, a second direction D2, and a third direction D3, and the first direction D1, the second direction D2, and the third direction D3 are perpendicular to one another. Specifically, the display panel 110 includes a plurality of pixels 112 arranged in an array on a plane formed by the first direction D1 and the second direction D2. Moreover, the liquid crystal layer 120 of the near-eye display device 100 has a first angle of inclination $\theta_1$ on a plane formed by the first direction D1 and the third direction D3 relative to the display panel 110.

Next, please refer to both FIG. 1B and FIG. 1C. In the embodiment, phase modulation occurs to at least a portion of the liquid crystal layer 120 of the near-eye display device 100 to modulate the image light beam IL (not shown in FIG. 1B and FIG. 1C). Specifically, phase modulation occurs to the liquid crystal layer 120 such that the image light beam IL passing through the liquid crystal layer 120 generates a first displacement DP1 in the first direction D1. After the image light beam IL is adjusted by the liquid crystal layer 120 and generates the first displacement DP1 in the first direction D1, the position of an image IM corresponding to the image light beam IL seen by the user is adjusted and the first displacement DP1 is generated in the first direction D1, such that the position of the image IM has the first displacement DP1 compared to the positions of the actual pixels 112. In the embodiment, one pixel 112 has a pixel width PW2 in the second direction D2 (i.e., the distance of the pixel 112 measured in the direction perpendicular to the second direction D2). Moreover, one pixel 112 has a pixel width PW1 in the first direction D1 (i.e., the distance of the pixel 112 measured in the direction perpendicular to the first direction D1). Specifically, the first displacement DP1 generated by the position of the image IM in the first direction D1 is less than or equal to the pixel width PW1 of one pixel 112 in the second direction D2.

In the embodiment, the liquid crystal layer 120 has an original refractive index before phase modulation, and the refractive index of the liquid crystal layer 120 is changed after the phase modulation, such as the refractive index thereof is increased. Therefore, when the image light beam IL passes through the liquid crystal layer 120, the travel route of the image light beam IL changes with whether or not phase modulation occurs to the liquid crystal layer 120. Specifically, the position of the image IM corresponding to the phase modulation of the liquid crystal layer 120 (i.e., the position of the adjusted image IM) and the position of the image IM corresponding to the liquid crystal layer 120 without phase modulation (i.e., the position of the image IM before adjustment) are different. The liquid crystal layer 120 can adjust the position of the image IM corresponding to the display panel 110 via the modulation to the image light beam IL, such that the position of the adjusted image IM is displaced (the first displacement DP1) compared to the position of the image IM before adjustment.

Figure 2A:
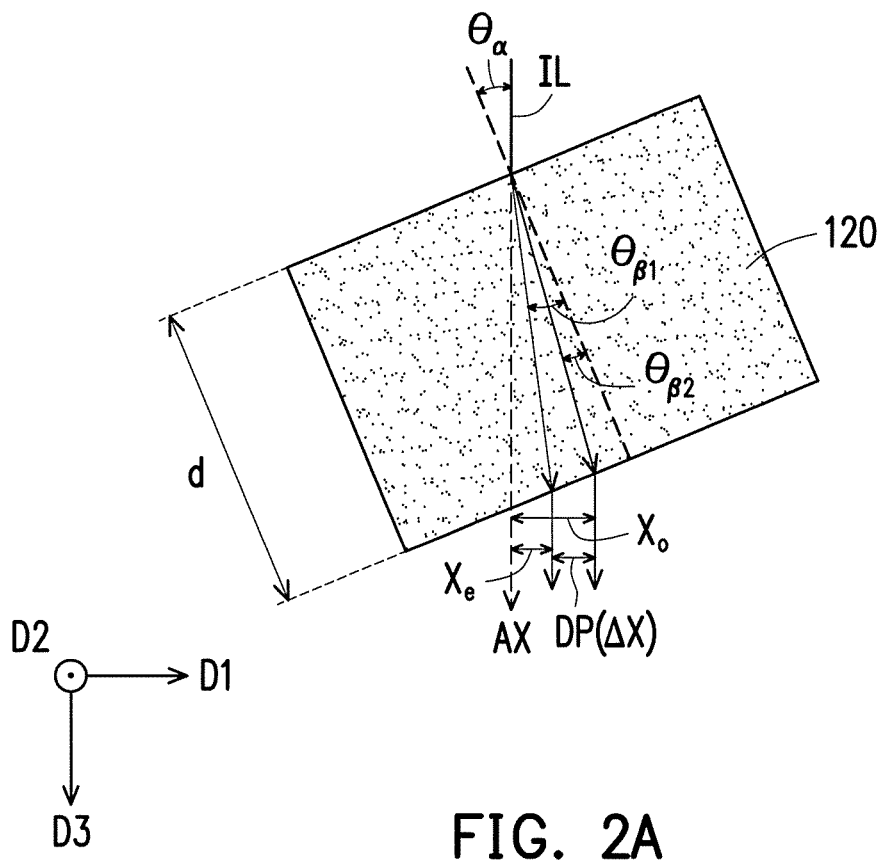
FIG. 2A shows a schematic of the optical path of an image light beam passing through a liquid crystal layer of the embodiment of FIG. 1A.

FIG. 2A shows a schematic of the optical path of the image light beam IL passing through the liquid crystal layer 120 of the embodiment of FIG. 1A. Please refer to FIG. 1A to FIG. 2A. In the embodiment, the image light beam IL is, for instance, incident to the liquid crystal layer 120 in a perpendicular direction AX (the perpendicular direction AX is, for instance, parallel to the third direction D3). Since the liquid crystal layer 120 has a first angle of inclination $\theta_1$ relative to the display panel 110, the surface of the image light beam IL incident to the liquid crystal layer 120 has an incident angle $\theta_\alpha$ and the incident angle $\theta_\alpha$ is, for instance, equivalent to the first angle of inclination $\theta_1$. Specifically, the liquid crystal layer 120 has a refractive index $n_0$ without phase modulation, and the liquid crystal layer 120 has a refractive index $n_e$ after phase modulation. The image light beam IL refracted on the surface of the liquid crystal layer 120 has an angle of refraction $\theta_{\beta1}$ when phase modulation does not occur to the liquid crystal layer 120, and the image light beam IL refracted on the surface of the liquid crystal layer 120 has an angle of refraction $\theta_{\beta2}$ when phase modulation occurs to the liquid crystal layer 120. Moreover, the external material of the liquid crystal layer 120 is, for instance, a translucent plastic material fixing the liquid crystal layer 120 having a refractive index $n_s$. In the embodiment, the following formulas can be obtained:

$$n_s \sin(\theta_\alpha) = n_0 \sin(\theta_{\beta1}) \qquad (1)$$

$$n_s \sin(\theta_\alpha) = n_e \sin(\theta_{\beta2}) \qquad (2)$$

By combining formulas (1) to (2), the following formula can be obtained:

$$n_e = \frac{n_e n_0}{\sqrt{n_e \sin(90° - \theta_\alpha)^2 + n_0 \cos(90° - \theta_\alpha)^2}} \qquad (3)$$

Via the above, if phase modulation does not occur to the liquid crystal layer 120, then a displacement $X_0$ of the image light beam IL emitted from the liquid crystal layer 120 can be calculated from the following formula:

$$X_0 = \frac{d}{\cos(\theta_{\beta1})} \sin(\theta_\alpha - \theta_{\beta1}) \qquad (4)$$

wherein d is the thickness of the liquid crystal layer 120. Moreover, after the phase modulation of the liquid crystal layer 120, a displacement $X_e$ of the image light beam IL emitted from the liquid crystal layer 120 can be calculated from the following formula:

$$X_e = \frac{d}{\cos(\theta_{\beta2})} \sin(\theta_\alpha - \theta_{\beta2}) \qquad (5)$$

By combining formulas (4) to (5), $X_e - X_0 = \Delta X$ (i.e., the first displacement DP1) can be obtained between the position of the image IM adjusted by the liquid crystal layer 120 and the position of the image IM not adjusted by the liquid crystal layer 120:

$$\Delta X = \frac{d}{\cos(\theta_{\beta2})} \sin(\theta_\alpha - \theta_{\beta2}) - \frac{d}{\cos(\theta_{\beta1})} \sin(\theta_\alpha - \theta_{\beta1}) \qquad (6)$$

By simplifying formula (6), the following formula can be obtained:

$$\Delta X = d \cos(\theta_\alpha) \times \tan(\theta_{\beta1} - \theta_{\beta2}) \qquad (7)$$

Figure 2B:
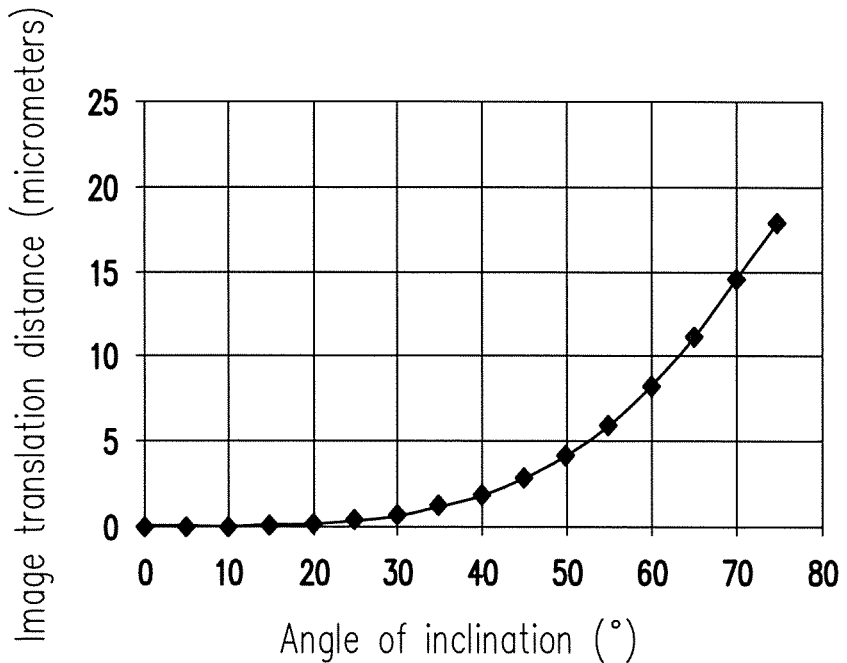
FIG. 2B shows a schematic of the translation distance of an image adjusted by the liquid crystal layer against the angle of inclination of the liquid crystal layer of the embodiment of FIG. 1A.

FIG. 2B shows a schematic of the translation distance of an image adjusted by the liquid crystal layer against the angle of inclination of the liquid crystal layer of the embodiment of FIG. 1A. Please refer to FIG. 2B. "Image translation distance" labeled in the vertical axis of FIG. 2B represents the translation distance of the image IM adjusted by the liquid crystal layer 120, i.e., a distance ΔX (the first displacement DP1) in units of micrometers. "Angle of inclination" labeled in the horizontal axis of FIG. 2B represents the first angle of inclination $\theta_1$ of the liquid crystal layer 120 relative to the display panel 110 in units of degrees (°). FIG. 2B is, for instance, data obtained under a thickness d of 50 micrometers, a refractive index $n_s$ of 1.4985, a refractive index $n_0$ of 1.5183, and a refractive index $n_e$ of 1.7371. In an embodiment of the invention, the parameters can be adjusted based on actual design, but the invention is not limited thereto. For instance, in the embodiment, when the first angle of inclination $\theta_1$ is, for instance, 70 degrees, the corresponding first displacement DP1 is, for instance, close to 15 micrometers.

In the embodiment, the liquid crystal layer 120 can adjust the position of the image IM corresponding to the display panel 110 via the modulation to the image light beam IL, such that the position of the adjusted image IM is displaced (the first displacement DP1) compared to the position of the image IM before adjustment. When the liquid crystal layer 120 continuously adjusts the position of the image IM at different time points, the user can see the positions of the image IM before and after adjustment at different time points. For instance, phase modulation can be not performed on the liquid crystal layer 120 at a first time point, and then phase modulation is performed on the liquid crystal layer 120 at a second time point, and the operation between the first time point and the second time point is used as one cycle to adjust the liquid crystal layer 120. When the adjustment is fast enough, such as when the liquid crystal layer 120 is adjusted at a frequency of 120 Hz, the user sees the image IM before adjustment and the image IM after adjustment at the same time, and the user cannot distinguish whether the image IM before adjustment and the image IM after adjustment are actually appearing at different time points. At this point, the user sees an image having a high resolution synthesized by the image IM before adjustment and the image IM after adjustment. Therefore, the near-eye display device 100 can achieve high resolution compared to existing near-eye display devices.

Figure 3A:
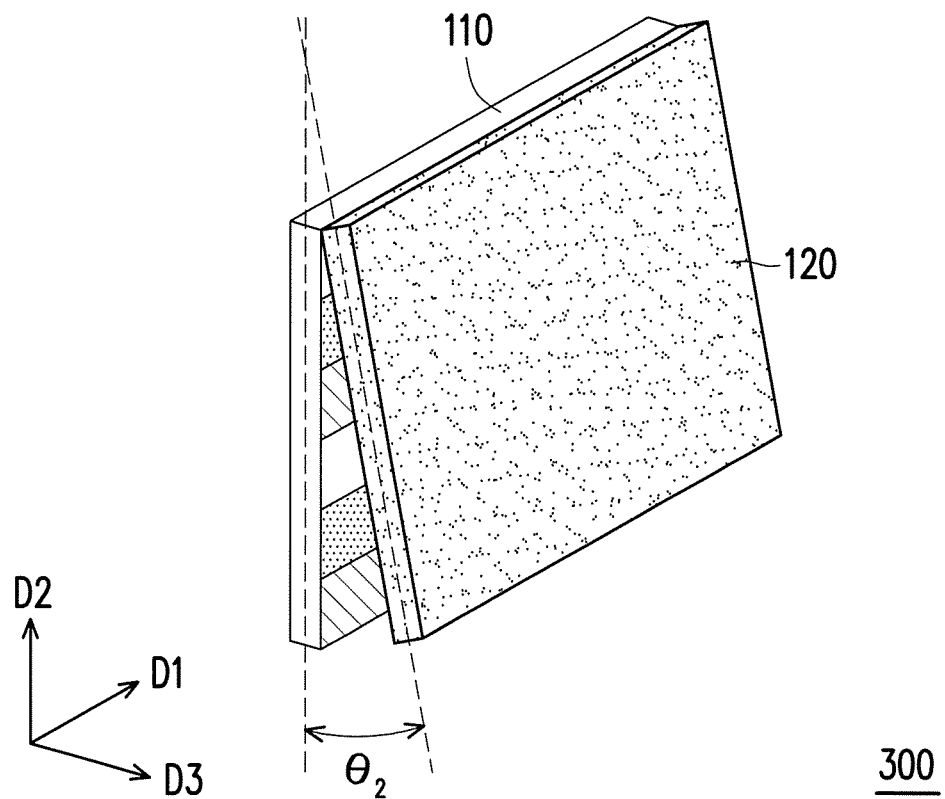
FIG. 3A shows a schematic of a liquid crystal layer disposed adjacent to a display panel of another embodiment of the invention.
Figure 3B:
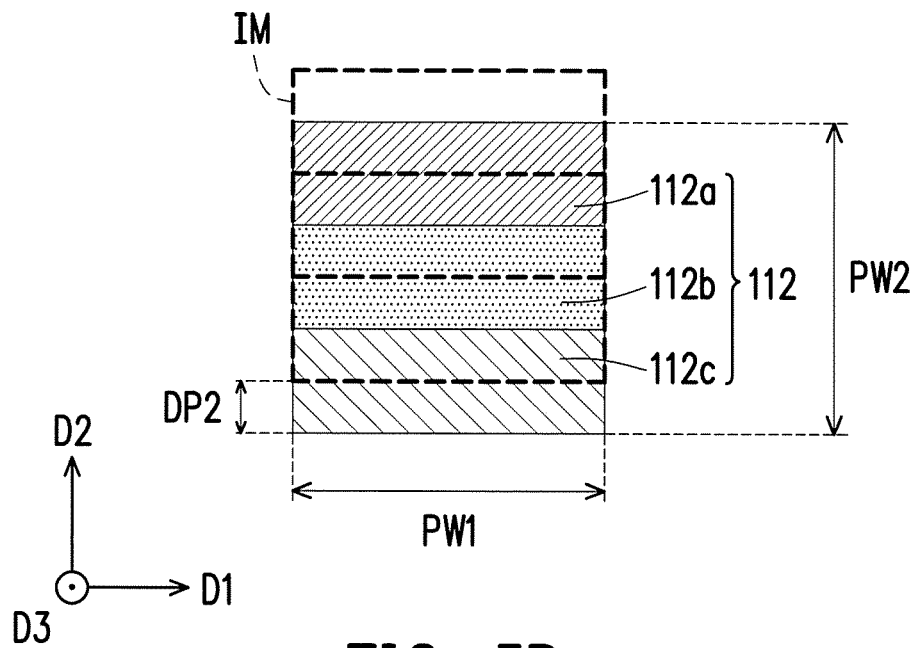
FIG. 3B shows the position of one pixel of a display panel and the position of the image adjusted by the liquid crystal layer of the embodiment of FIG. 3A.

FIG. 3A shows a schematic of a liquid crystal layer disposed adjacent to a display panel of another embodiment of the invention, and FIG. 3B shows the position of one pixel of the display panel and the position of the image adjusted by the liquid crystal layer of the embodiment of FIG. 3A. Please refer to FIG. 3A and FIG. 3B. Specifically, a near-eye display device 300 of FIG. 3A is similar to the near-eye display device 100 of FIG. 1A, and the same elements are represented by the same reference numerals, and the differences between the two embodiments are as described below. In the near-eye display device 100 of FIG. 1A, the liquid crystal layer 120 has the first angle of inclination $\theta_1$ in the second direction D2 relative to the display panel 100. In contrast, the display panel 110 of the near-eye display device 300 of FIG. 3A is disposed on a plane formed by the first direction D1 and the second direction D2, and the liquid crystal layer 120 has a second angle of inclination $\theta_2$ relative to a plane formed by the second direction D2 and the third direction D3 relative to the display panel 110. Moreover, referring to FIG. 3B, in the embodiment, phase modulation can occur to the liquid crystal layer 120 such that the image light beam IL passing through the liquid crystal layer 120 generates a second displacement DP2 in the second direction D2, and the second displacement DP2 is less than or equal to the pixel width PW2 of one pixel 112 in the first direction D1. Specifically, descriptions of other relevant components of FIG. 3A are as provided for the embodiment of FIG. 1A and are not repeated herein.

Figure 4A:
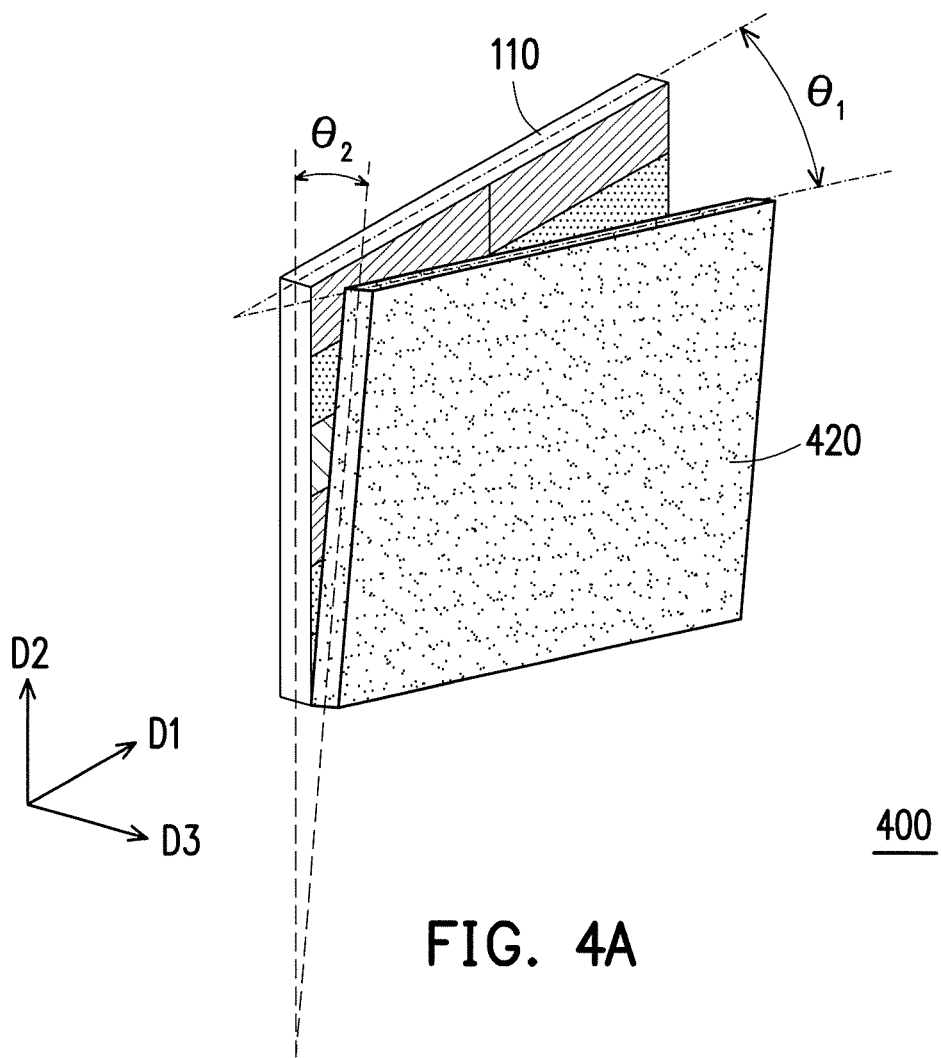
FIG. 4A shows a schematic of a liquid crystal layer disposed adjacent to a display panel of yet another embodiment of the invention.
Figure 4B:
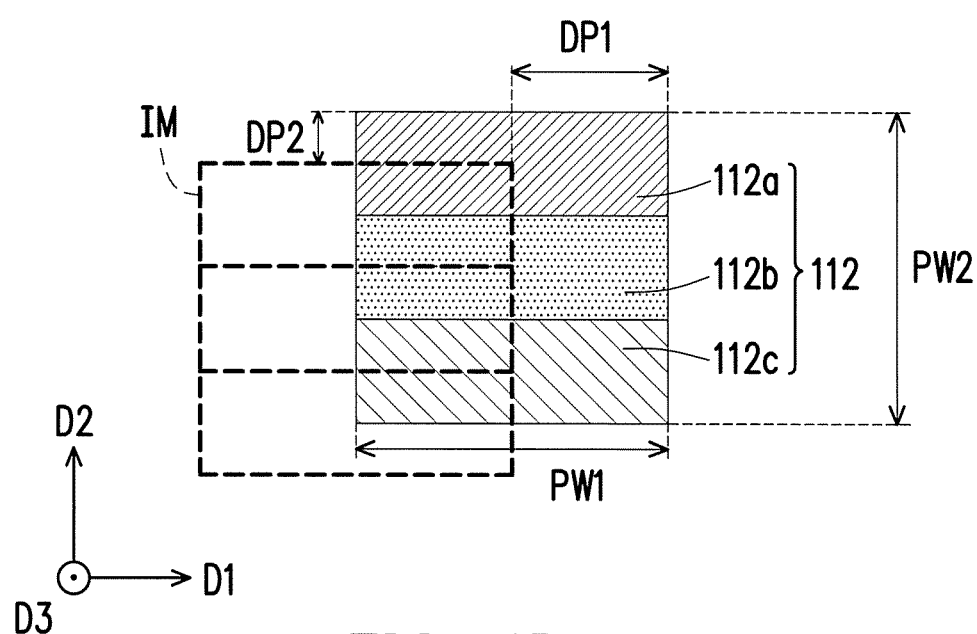
FIG. 4B shows the position of one pixel of the display panel and the position of the image adjusted by the liquid crystal layer of the embodiment of FIG. 4A.

FIG. 4A shows a schematic of a liquid crystal layer disposed adjacent to a display panel of yet another embodiment of the invention, and FIG. 4B shows the position of one pixel of the display panel and the position of the image adjusted by the liquid crystal layer of the embodiment of FIG. 4A. Please refer to FIG. 4A and FIG. 4B. Specifically, a near-eye display device 400 of FIG. 4A is similar to the near-eye display device 100 of FIG. 1A, and the same elements are represented by the same reference numerals, and the differences between the two embodiments are as described below. In the near-eye display device 100 of FIG. 1A, the liquid crystal layer 420 has a first angle of inclination $\theta_1$ on a plane formed by the first direction D1 and the third direction D3 relative to the display panel 110. In contrast, the liquid crystal layer 420 of the near-eye display device 400 of FIG. 4A has a first angle of inclination $\theta_1$ on a plane formed by the first direction D1 and the third direction D3 relative to the display panel 110, and has a second angle of inclination $\theta_2$ on a plane formed by the second direction D2 and the third direction D3 relative to the display panel 110 at the same time. Moreover, referring to FIG. 4B, in the embodiment, phase modulation can occur to the liquid crystal layer 420 such that the image light beam IL passing through the liquid crystal layer 420 generates the first displacement DP1 in the first direction D1, and the first displacement DP1 is less than or equal to the pixel width PW1 of one pixel 112 in the second direction D2. At the same time, phase modulation can occur to the liquid crystal layer 420 such that the image light beam IL passing through the liquid crystal layer 420 generates the second displacement DP2 in the second direction D2, and the second displacement DP2 is less than or equal to the pixel width PW2 of one pixel 112 in the first direction D1. Specifically, descriptions of other relevant components of the embodiment of FIG. 4A are as provided for the embodiment of FIG. 1A and are not repeated herein.

Moreover, in some embodiments, the liquid crystal layer 420 can optionally include a first sub-liquid crystal layer and a second sub-liquid crystal layer stacked on top of each other. The first sub-liquid crystal layer has a first angle of inclination $\theta_1$ on a plane formed by the first direction D1 and the third direction D3 relative to the display panel 110, and the second sub-liquid crystal layer has a second angle of inclination $\theta_2$ on a plane formed by the second direction D2 and the third direction D3 relative to the display panel 110. Moreover, phase modulation can occur to the first sub-liquid crystal layer such that the image light beam IL passing through the first sub-liquid crystal layer generates the first displacement DP1 in the first direction D1, and phase modulation can occur to the second sub-liquid crystal layer such that the image light beam IL passing through the second sub-liquid crystal layer generates the second displacement DP2 in the second direction D2. Moreover, the first displacement DP1 is less than or equal to the pixel width PW1 of one pixel 112 in the second direction D2, and the second displacement D2 is less than or equal to the pixel width PW2 of one pixel 112 in the first direction D1. Specifically, these embodiments are implemented by different sub-liquid crystal layers (such as the first sub-liquid crystal layer and the second sub-liquid crystal layer) as a result of displacements generated by the liquid crystal layer 420 in different directions of the embodiment of FIG. 4A. Descriptions of other relevant components of the embodiment are as provided for the embodiments of FIG. 1A, FIG. 3A, and FIG. 4A and are not repeated herein.

Figure 5A:
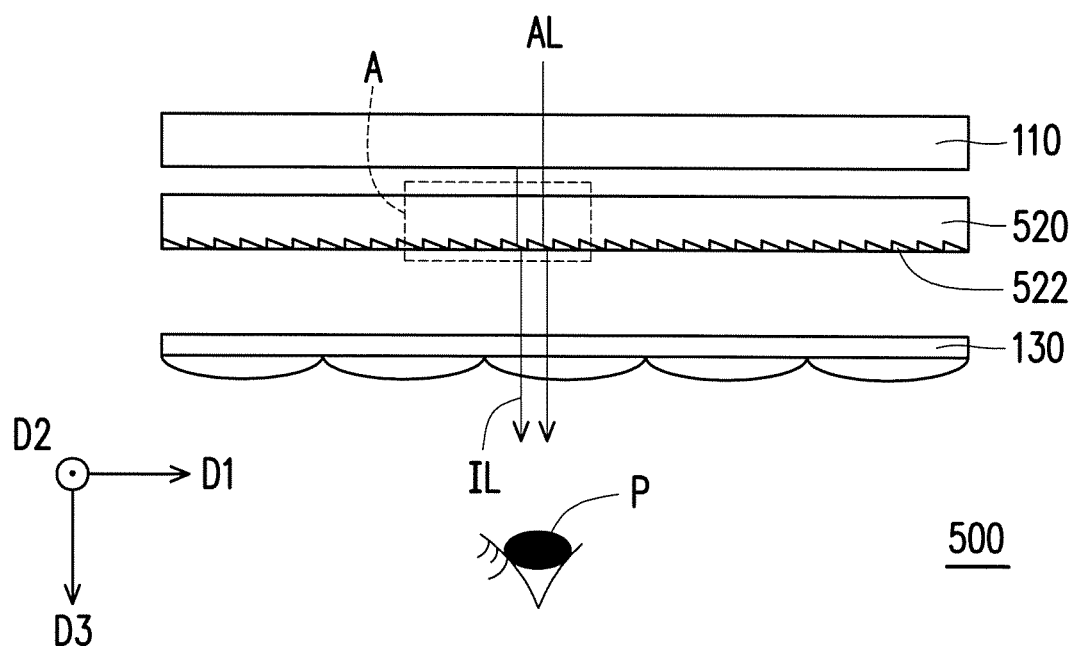
FIG. 5A shows a side view of the near-eye display device of still yet another embodiment of the invention.
Figure 5B:
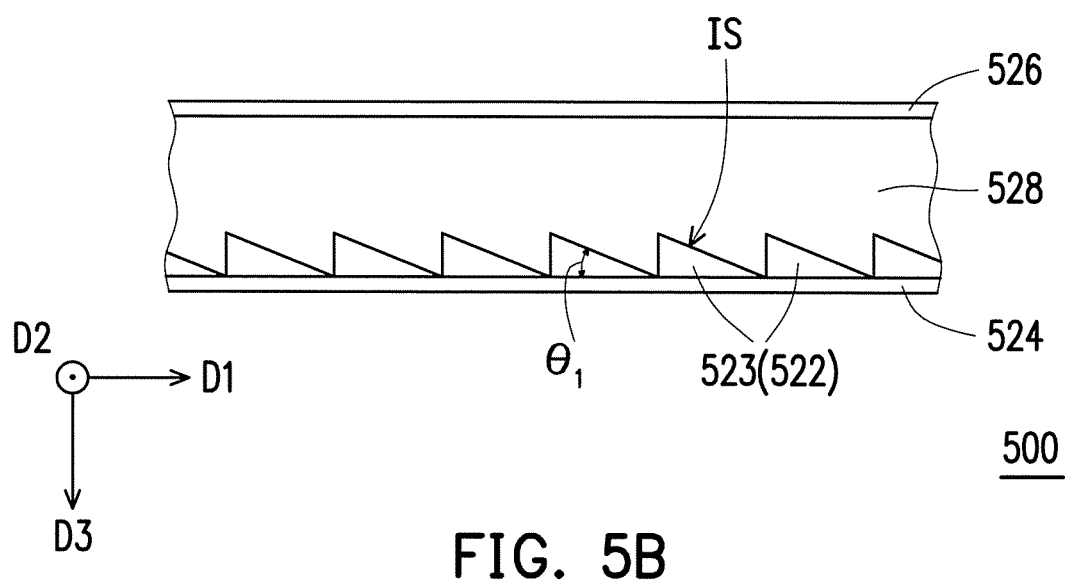
FIG. 5B shows an enlarged schematic of region A of FIG. 5A.

FIG. 5A shows a top view of the near-eye display device of another embodiment of the invention, and FIG. 5B shows an enlarged schematic of region A of FIG. 5A. A near-eye display device 500 of FIG. 5A and FIG. 5B is similar to the near-eye display device 100 of FIG. 1A, and the same elements are represented by the same reference numerals and are not repeated herein. The differences between the near-eye display device 500 and the near-eye display device 100 are described below. Please refer to both FIG. 5A and FIG. 5B. In the embodiment, a liquid crystal layer 520 of the near-eye display device 500 further includes an optical microstructure layer 522. The optical microstructure layer 522 is located between the lens element 130 and the display panel 110, and the optical microstructure layer 522 includes a plurality of optical microstructures 523 facing the display panel 110 and disposed in an arrangement. Moreover, each of the optical microstructures 523 includes an inclined surface IS inclined relative to the display panel 110. Specifically, the optical microstructures 523 are, for instance, prism structures. In the embodiment, the size of the prism structures is, for instance, not greater than the diameter of one lens of the micro lens array (the lens element 130), but the invention is not limited thereto.

Moreover, in the embodiment, the liquid crystal layer 520 further includes a first substrate 524, a second substrate 526, and a liquid crystal material 528, and the liquid crystal material 528 is filled between the first substrate 524 and the second substrate 526. Moreover, the optical microstructure layer 522 is disposed on the first substrate 524 and located between the first substrate 524 and the second substrate 526, and the liquid crystal material 528 covers the inclined surfaces IS of the optical microstructures 523 and are aligned on the inclined surfaces IS. In the embodiment, the first substrate 524 and the second substrate 526 are, for instance, transparent glass plates, and the first substrate 524 is used to carry these optical microstructures 523. Moreover, the width of each of the optical microstructures 523 in the first direction D1 is greater than or equal to the pixel width of one pixel (not shown in FIGS. 5A and 5B) in the first direction D1, and the width of each of the optical microstructures 523 in the second direction D2 is greater than or equal to the pixel width of one pixel in the second direction D2.

In the embodiment, each of the inclined surfaces IS has a first angle of inclination $\theta_1$ (such as the first angle of inclination $\theta_1$ of the embodiment of FIG. 1A) on a plane formed by the first direction D1 and the second direction D2 relative to the display panel 110. Moreover, phase modulation can also occur to the liquid crystal layer 520 such that the image light beam IL passing through the liquid crystal layer 520 generates a first displacement in the third direction D3 (such as the first displacement DP1 of the embodiment of FIG. 1A), and the first displacement is less than or equal to the pixel width of one pixel in the second direction D2 (such as the pixel width PW1 of the embodiment of FIG. 1A). Specifically, the inclined surfaces IS of the optical microstructures 523 of the embodiments of FIGS. 5A and 5B are, for instance, equivalent to the inclined surfaces of the liquid crystal layer 120 having the first angle of inclination $\theta_1$ of the embodiment of FIG. 1A. Moreover, in some embodiments, each of the inclined surfaces IS has a second angle of inclination $\theta_2$ (such as the second angle of inclination $\theta_2$ of the embodiment of FIG. 3A) on a plane forming by the second direction D2 and the third direction D3 relative to the display panel 110. In these embodiments, phase modulation occurs to the liquid crystal layer such that the image light beam IL passing through the liquid crystal layer generates a second displacement in the second direction D2 (such as the second displacement DP2 of the embodiment of FIG. 3A), and the second displacement DP2 is less than or equal to the pixel width of one pixel in the first direction D1 (such as the pixel width PW2 of the embodiment of FIG. 3A), and the invention is not limited thereto.

Figure 6A:
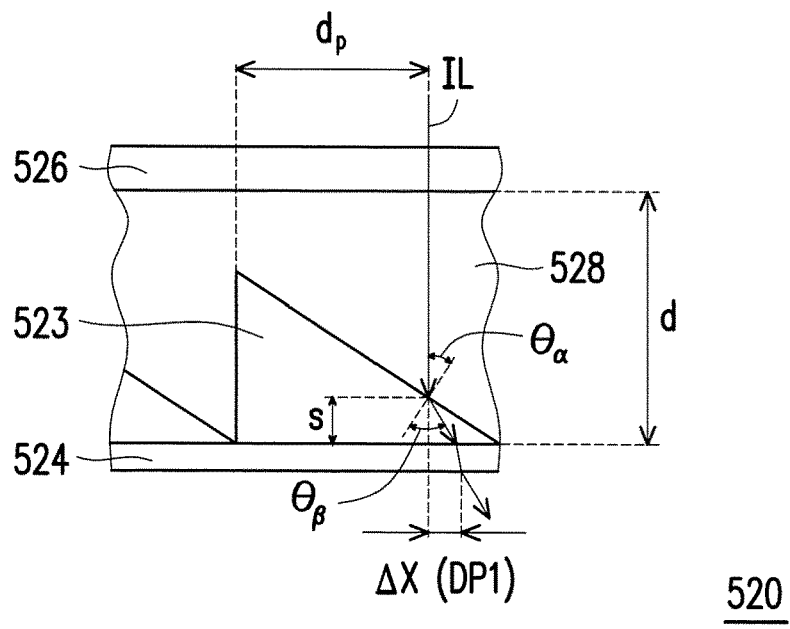
FIG. 6A shows a schematic of the optical path of an image light beam passing through a liquid crystal material and optical microstructures of the embodiment of FIG. 5A.

FIG. 6A shows a schematic of the optical path of an image beam passing through a liquid crystal material and optical microstructures of the embodiments of FIGS. 5A and 5B. Please refer to FIG. 6A. In the embodiment, the image light beam IL is, for instance, incident to the liquid crystal layer 520 in a perpendicular direction (such as the direction parallel to the third direction D3). The image light beam IL, for instance, passes through the second substrate 526, the liquid crystal material 528, the optical microstructures 523, and the first substrate 524 in order. Since each of the inclined surfaces IS of the optical microstructures 523 has the first angle of inclination $\theta_1$ on the plane formed by the first direction D1 and the third direction D3 relative to the display panel 110, the image light beam IL incident to the inclined surfaces IS has an incident angle $\theta_\alpha$, and the incident angle $\theta_\alpha$ is, for instance, equal to the first angle of inclination $\theta_1$. Moreover, the image light beam IL has an angle of refraction $\theta_\beta$ when refracted on the inclined surfaces IS. Specifically, the liquid crystal layer 520 has a refractive index $n_p$ when phase modulation occurs, and the optical microstructures 523 have a refractive index $n_s$. In the embodiment, the following formulas can be obtained:

$$n_p \sin(\theta_\alpha) = n_s \sin(\theta_\beta) \tag{8}$$

Based on formula (8), the following formula can be obtained:

$$s = (d - d_p \tan(\theta_\alpha)) \tag{9}$$

wherein d is the thickness of the liquid crystal layer 520 (i.e., the thickness between the first substrate 524 and the second substrate 526), s is the distance from the incident point of the image light beam IL to the first substrate 524, and $d_p$ is the perpendicular distance between the inclined surfaces IS and the contact point of the second substrate 526 and the image light beam IL. Based on formulas (8) to (9), the displacement $\Delta X$ of the image light beam IL generated by the refraction of the optical microstructures 523 (i.e., the first displacement DP1) can be obtained by the following formula:

$$\Delta X = (d - d_p \tan(\theta_\alpha)) \times \tan(\theta_\beta - \theta_\alpha) \tag{10}$$

Figure 6B:
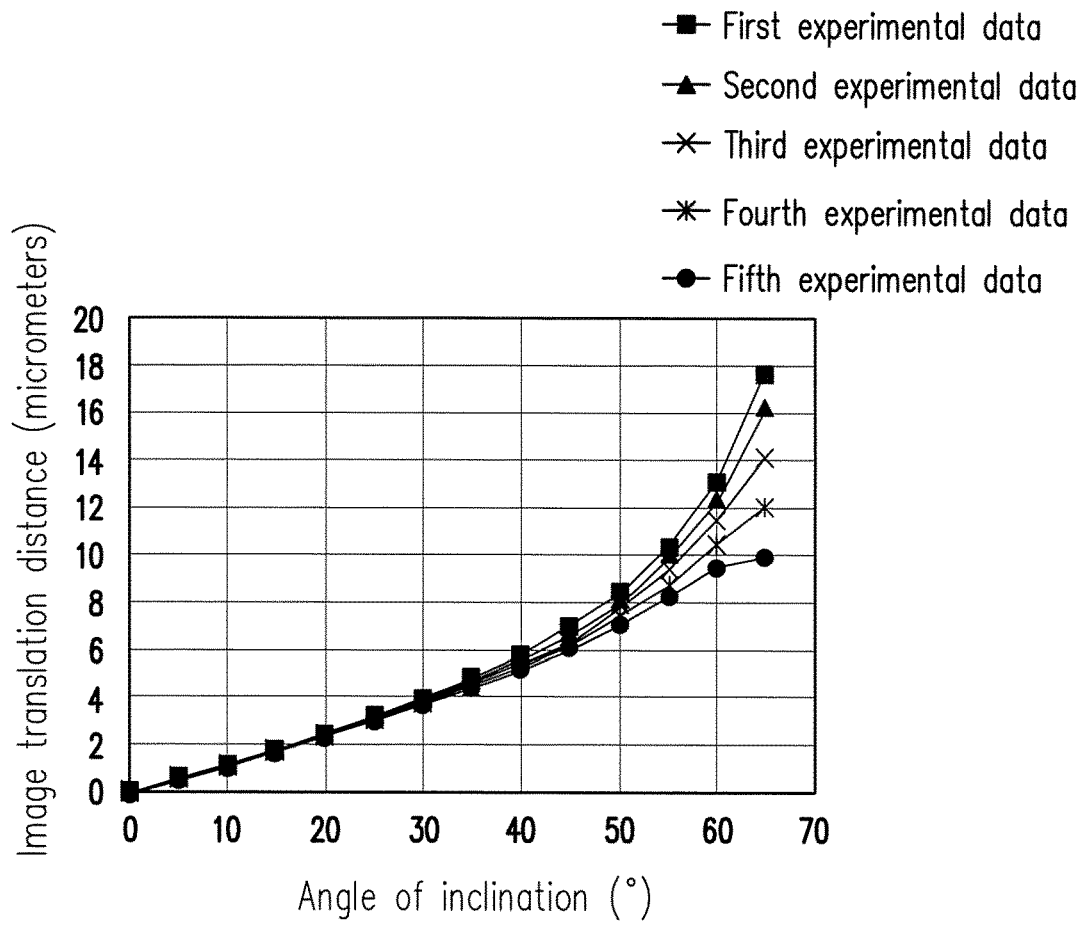
FIG. 6B shows a schematic of the translation distance of an image adjusted by the liquid crystal layer against the angle of inclination of the inclined surfaces of the optical microstructures of the embodiment of FIG. 5A.

FIG. 6B shows a schematic of the translation distance of an image adjusted by the liquid crystal layer against the angle of inclination of the inclined surfaces of the optical microstructures of the embodiment of FIG. 5A. Please refer to FIG. 6B. "Image translation distance" labeled in the vertical axis of FIG. 6B represents the translation distance of the image IM adjusted by the liquid crystal layer 520, i.e., the distance $\Delta X$ (the first displacement DP1) in units of micrometers. Moreover, "angle of inclination" labeled in the horizontal axis of FIG. 6B represents the first angle of inclination $\theta_1$ of the inclined surfaces IS relative to the display panel 110 in units of degrees (°). Specifically, FIG. 6B lists multiple sets of experimental data, such as first experimental data, second experimental data, third experimental data, fourth experimental data, and fifth experimental data, and the data are, for instance, obtained at a thickness d of 100 micrometers, a refractive index $n_s$ of 1.4985, and a refractive index $n_p$ of 1.6. Moreover, in the first to fifth experimental data, the distance $d_p$ is not the same, that is, in the first to fifth experimental data, the positions that the image light beam IL enters the optical microstructures 523 are not the same. In an embodiment of the invention, the parameters can be adjusted based on actual design, but the invention is not limited thereto.

In the embodiment, the liquid crystal layer 520 can adjust the position of the image IM corresponding to the display panel 110 via the modulation to the image light beam IL, such that the position of the adjusted image IM is displaced (the first displacement DP1) compared to the position of the image IM before adjustment. When the user sees the positions of the image IM before and after adjustment at different time points, the user sees an image having a high resolution synthesized by the image IM before adjustment and the image IM after adjustment. Specifically, the near-eye display device 500 of the embodiment can achieve similar technical effects to the near-eye display device 100 of the embodiment of FIG. 1A, and can have high resolution compared to existing near-eye display devices. Moreover, the liquid crystal layer 520 of the embodiment of FIG. 5A does not need to be disposed at an inclination as the liquid crystal layer 120 of the embodiment of FIG. 1A, and the inclined surfaces IS of the liquid crystal layer 520 via the optical microstructures 523 of the embodiment of FIG. 5A are equivalent to the inclined surfaces of the liquid crystal layer 120 having the first angle of inclination $\theta_1$ of the embodiment of FIG. 1A. Therefore, the near-eye display device 500 of the embodiment of FIG. 5A has a smaller volume compared to the near-eye display device 100 of the embodiment of FIG. 1A.

Figure 7:
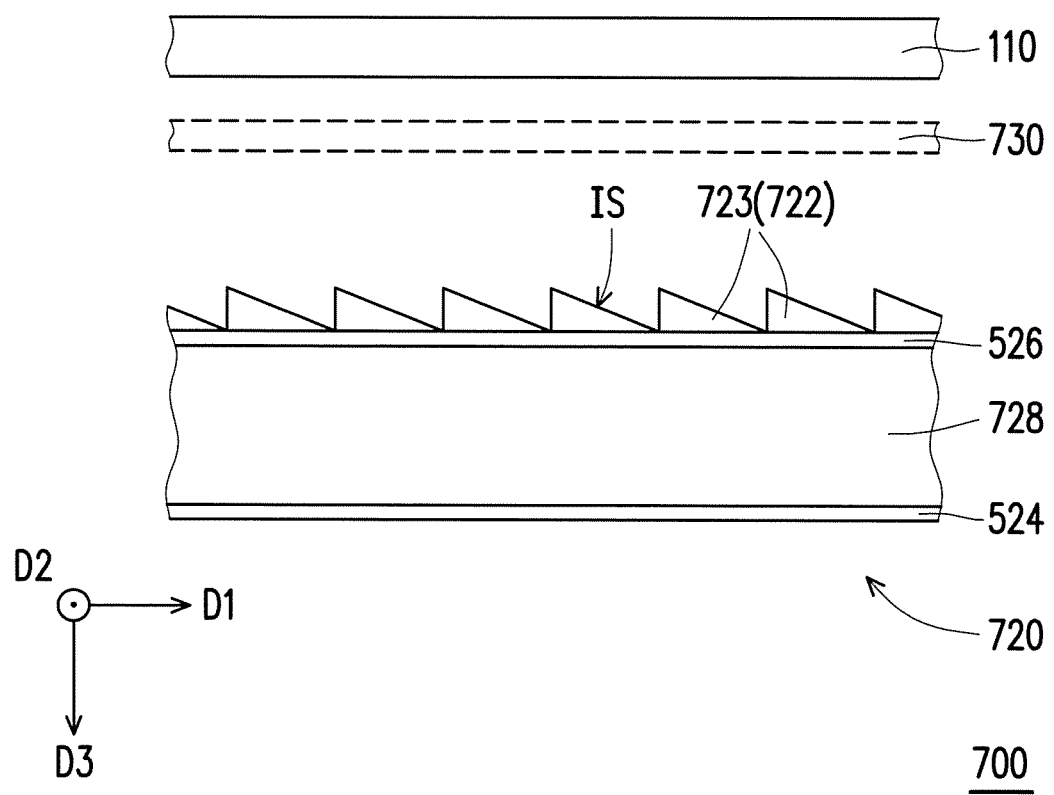
FIG. 7 shows an enlarged schematic of a partial region of the liquid crystal layer of the near-eye display device of another embodiment of the invention.

FIG. 7 shows an enlarged schematic of a partial region of the liquid crystal layer of the near-eye display device of another embodiment of the invention. Please refer to FIG. 7. In the embodiment, a liquid crystal layer 720 is similar to the liquid crystal layer 520 of the embodiment of FIG. 5A, and the components and relevant descriptions thereof are as provided for the liquid crystal layer 520 of the embodiment of FIG. 5A, and the same elements are represented by the same reference numerals and are not repeated herein. The differences between the liquid crystal layer 720 and the liquid crystal layer 520 are as described below. In the embodiment, the optical microstructure layer 722 of the liquid crystal layer 720 is disposed on the second substrate 526 and located between the second substrate 526 and the display panel 110. Moreover, the material of the optical microstructures 723 of the optical microstructure layer 722 has biconic properties. In the embodiment, the optical microstructures 723 are not disposed between the first substrate 524 and the second substrate 526, and the liquid crystal material 728 does not cover the inclined surfaces IS of the optical microstructures 723 and is not aligned on the inclined surfaces IS. Moreover, in the embodiment, a partition 730 can be optionally disposed between the optical microstructures 723 and the display panel 110, such as a glass plate, to avoid direct contact between the optical microstructures 723 and the display panel 110. Specifically, since the optical microstructures 723 have biconic properties, the near-eye display device of the embodiment can adjust the position of the image IM corresponding to the display panel 110 to at least two states based on whether or not phase modulation occurs to the liquid crystal material 728 of the liquid crystal layer 720. Therefore, the near-eye display device of the embodiment can achieve similar technical effects to the near-eye display device 500 of the embodiment of FIG. 5A, and can have high resolution. Moreover, compared to the near-eye display device 500 of the embodiment of FIG. 5A, the near-eye display device of the embodiment of FIG. 7 does not need to align the liquid crystal material 728 to the inclined surfaces IS and can have a smaller size and fewer process steps compared to the existing near-eye display device.

Figure 8A:
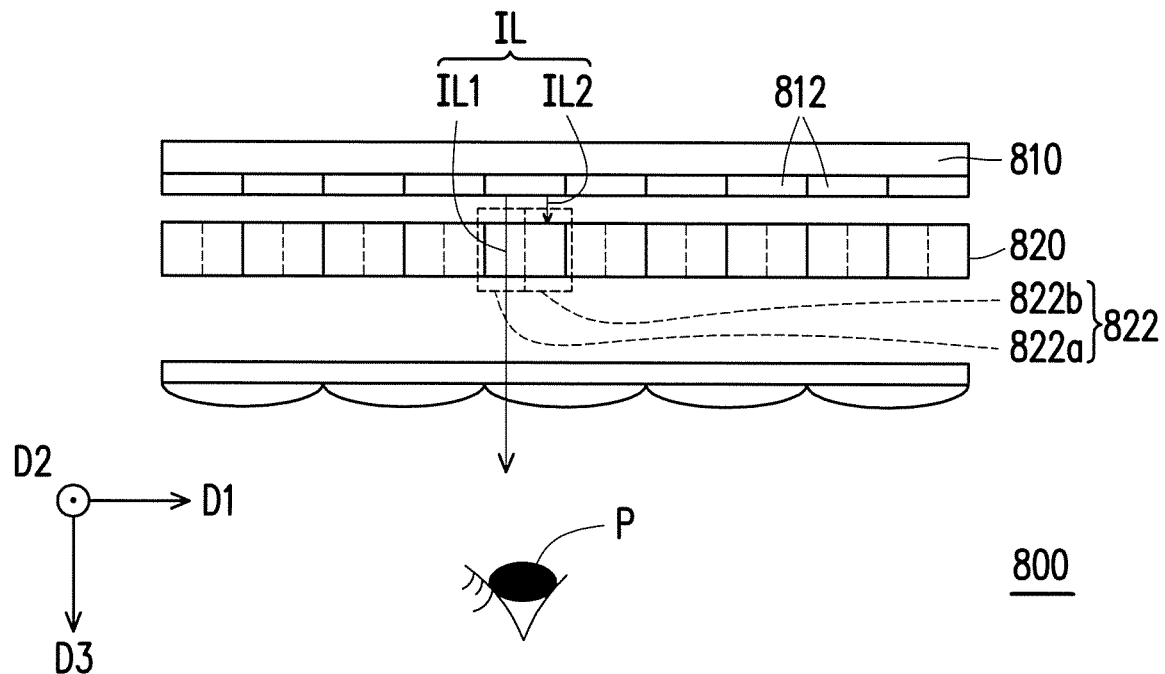
FIG. 8A shows a side view of the near-eye display device of yet another embodiment of the invention.
Figure 8B:
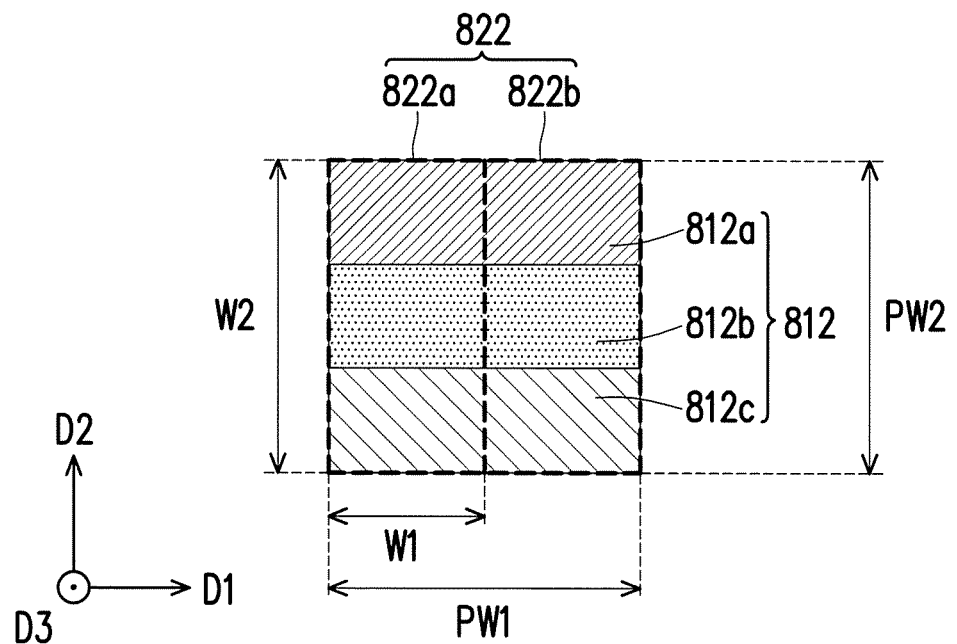
FIG. 8B shows the position of one pixel of a display panel and the positions of a plurality of liquid crystal units of the embodiment of FIG. 8A.

FIG. 8A shows a top view of the near-eye display device of yet another embodiment of the invention, and FIG. 8B shows the position of one pixel of the display panel of the embodiment of FIG. 8A and the positions of a plurality of liquid crystal units. A near-eye display device 800 of the embodiment of FIG. 8A is similar to the near-eye display device 100 of the embodiment of FIG. 1A, and the same elements are represented by the same reference numerals and are not repeated herein. The differences between the near-eye display device 800 and the near-eye display device 100 are described below. Please refer to both FIG. 8A and FIG. 8B. In the embodiment, a display panel 810 of the near-eye display device 800 includes a plurality of pixels 812 arranged in an array on a plane formed by the first direction D1 and the second direction D2, and each of the pixels 812 includes, for instance, a sub-pixel 812a, a sub-pixel 812b, and a sub-pixel 812c. Moreover, the liquid crystal layer 820 of the near-eye display device 800 includes a plurality of liquid crystal units 822 arranged in an array along the first direction D1 and the second direction D2. Specifically, referring to FIG. 8B, in the embodiment, a width W1 of each of the liquid crystal units 822 in the first direction D1 is less than or equal to a pixel width PW1 of one pixel 812 in the second direction D2, and a width W2 of each of the liquid crystal units 822 in the second direction D2 is less than or equal to a pixel width PW2 of one pixel 812 in the first direction D1. Moreover, each of the liquid crystal units 822 at least partially covers at least one pixel. For instance, a liquid crystal unit 822a in the liquid crystal units 822 at least partially covers the sub-pixel 812a, the sub-pixel 812b, and the sub-pixel 812c of the pixel 812, and a liquid crystal unit 822b in the liquid crystal units 822 also at least partially covers the sub-pixel 812a, the sub-pixel 812b, and the sub-pixel 812c of the pixel 812. However, in some embodiments, the number of sub-pixels and area covered by each of the liquid crystal units 822 can be changed based on actual display requirements, and the invention is not limited thereto.

In the embodiment, phase modulation occurs to at least a portion of the liquid crystal units 822 to adjust at least a portion of the image light beam IL. Specifically, at least a portion of each of the pixels 812a, 812b, and 812c in the pixels 812 corresponds to at least two liquid crystal units 822. Phase modulation can occur to at least a portion of the liquid crystal units 822 corresponding to one pixel 812 at a first time point to modulate the image light beam IL, and phase modulation can occur to at least another portion of the liquid crystal units 822 corresponding to the pixel 812 at a second time point to modulate the image light beam IL. In the embodiment, the pixels 812 and the corresponding liquid crystal units 822 are, for instance, overlapped in the direction perpendicular to the pixels 812. In the following, the liquid crystal unit 822a and the liquid crystal unit 822b shown in FIG. 8A and FIG. 8B are provided as examples. For instance, FIG. 8B shows the pixels 812 corresponding to the liquid crystal unit 822a and the liquid crystal unit 822b. At the first time point, phase modulation can occur to the liquid crystal unit 822a such that an image light beam IL1 (a portion of the image light beam IL) can pass through the liquid crystal unit 822a. At the same time, phase modulation can occur to the liquid crystal unit 822b such that an image light beam IL2 (a portion of the image light beam IL) cannot pass through the liquid crystal unit 822*b*. Next, at the second time point, phase modulation can occur to the liquid crystal unit 822*a* such that the image light beam IL1 cannot pass through the liquid crystal unit 822*a*. At the same time, phase modulation can occur to the liquid crystal unit 822*b* such that the image light beam IL2 can pass through the liquid crystal unit 822*b*. In other words, at the first time point, the position of the image (not shown) corresponding to the display panel 810 is equivalent to the position of the liquid crystal unit 822*a*. Moreover, at the second time point, the position of the image (not shown) corresponding to the display panel 810 is equivalent to the position of the liquid crystal unit 822*b*. In the embodiment, the operation between the first time point and the second time point can be used as one cycle to adjust the liquid crystal layer 820. When the adjustment is fast enough, such as when the liquid crystal layer 820 is adjusted at a frequency of 120 Hz or 240 Hz, the user sees the image having high resolution synthesized from the image at the first time point and the image at the second time point. Accordingly, the near-eye display device 800 of the embodiment can achieve similar technical effects to the near-eye display device 100 of the embodiment of FIG. 1A, and can have high resolution compared to existing near-eye display systems.

Figure 9A:
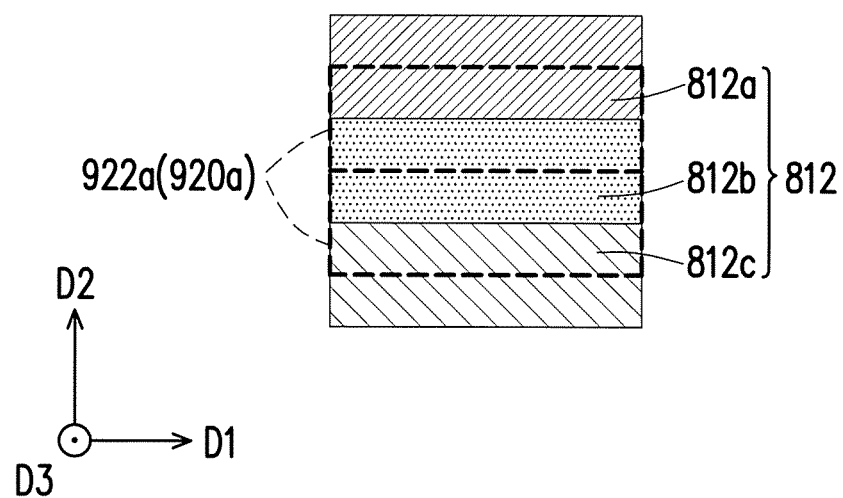
FIG. 9A to FIG. 9H show the positions of one/a plurality of pixels of a display panel and the positions of a plurality of liquid crystal units of some embodiments of the invention.

FIG. 9A to FIG. 9H show the positions of one or a plurality of pixels of a display panel and the positions of a plurality of liquid crystal units of some embodiments of the invention. Specifically, the near-eye display device of the embodiments of FIG. 9A to FIG. 9H is similar to the near-eye display device 800 of the embodiment of FIG. 8A, and the same elements are represented by the same reference numerals and are not repeated herein. In FIG. 9A to FIG. 9H, only one or a plurality of pixels 812 and a plurality of liquid crystal units are shown to describe the relationship between the positions of the liquid crystal units and the one or a plurality of pixels 812. Specifically, the number of the pixels 812 and the number of the liquid crystal units in the embodiments are only schematic representations, and the invention is not limited thereto. Please first refer to FIG. 9A to FIG. 9C. In FIG. 9A, the positions of the pixels 812 and the positions of the liquid crystal units 922*a* of the liquid crystal layer 920*a* are staggered with one another. Specifically, the positions of the pixels 812 and the positions of the liquid crystal units 922*a* are staggered with one another in the second direction D2. That is, the edge of the liquid crystal units 922*a* parallel to the first direction D1 is not aligned with the edge of the pixels 812 parallel to the first direction D1. Moreover, in the embodiment, the size of one liquid crystal unit 922*a* is the same as one sub-pixel (such as the sub-pixel 812*a*, 812*b*, or 812*c*).

Figure 9B:
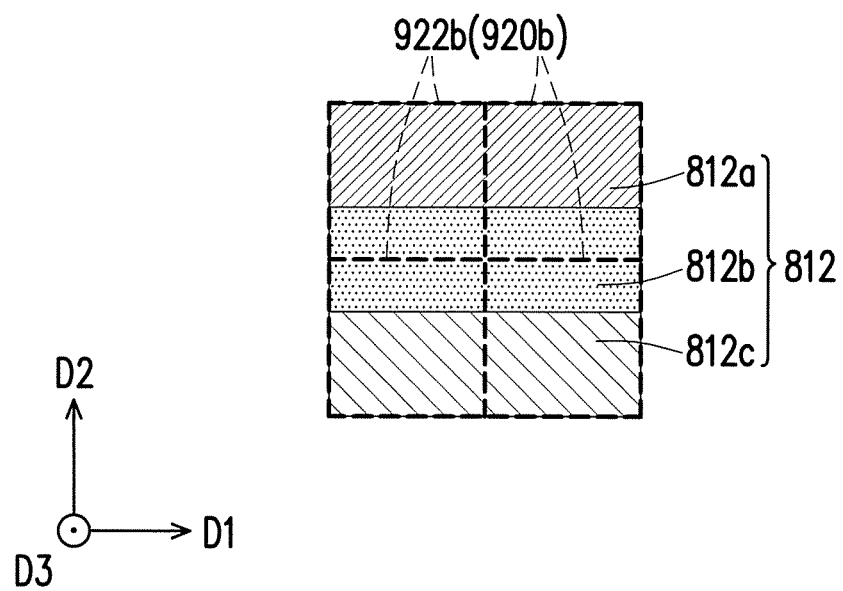
Figure 9C:
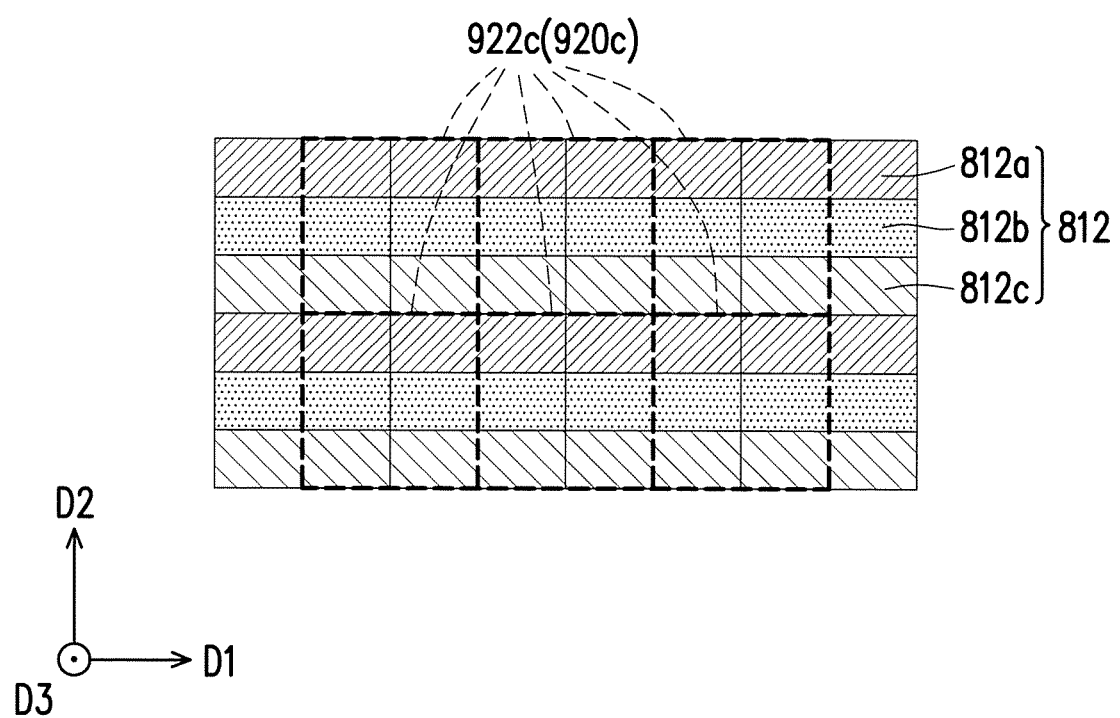
Figure 9D:
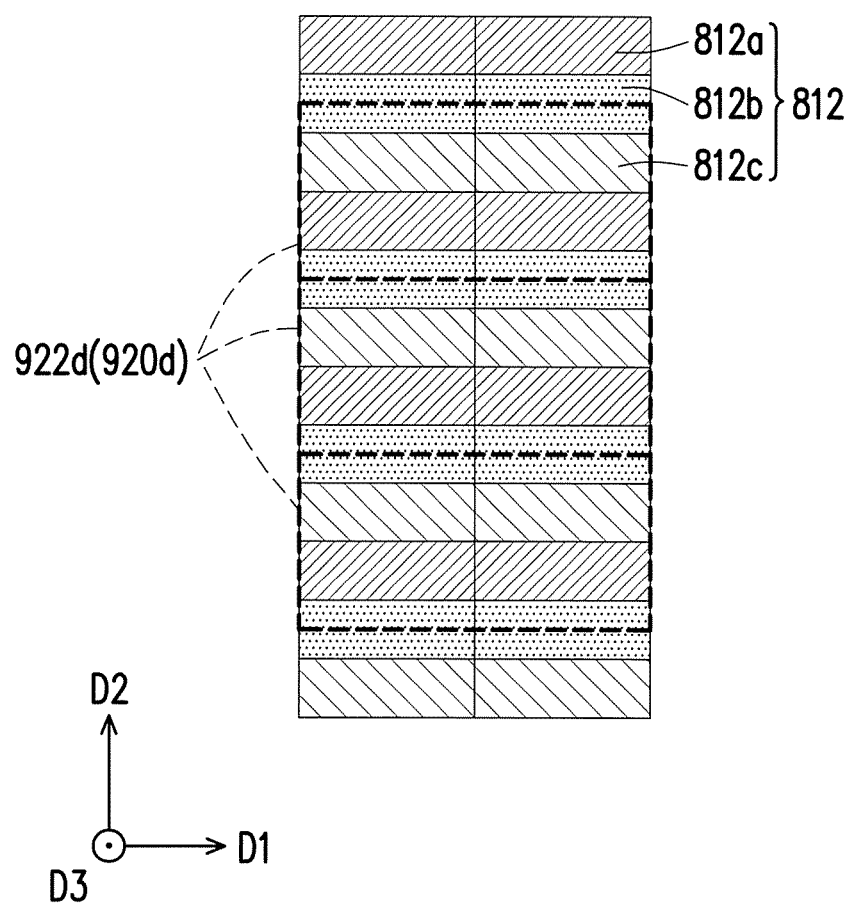
Figure 9E:
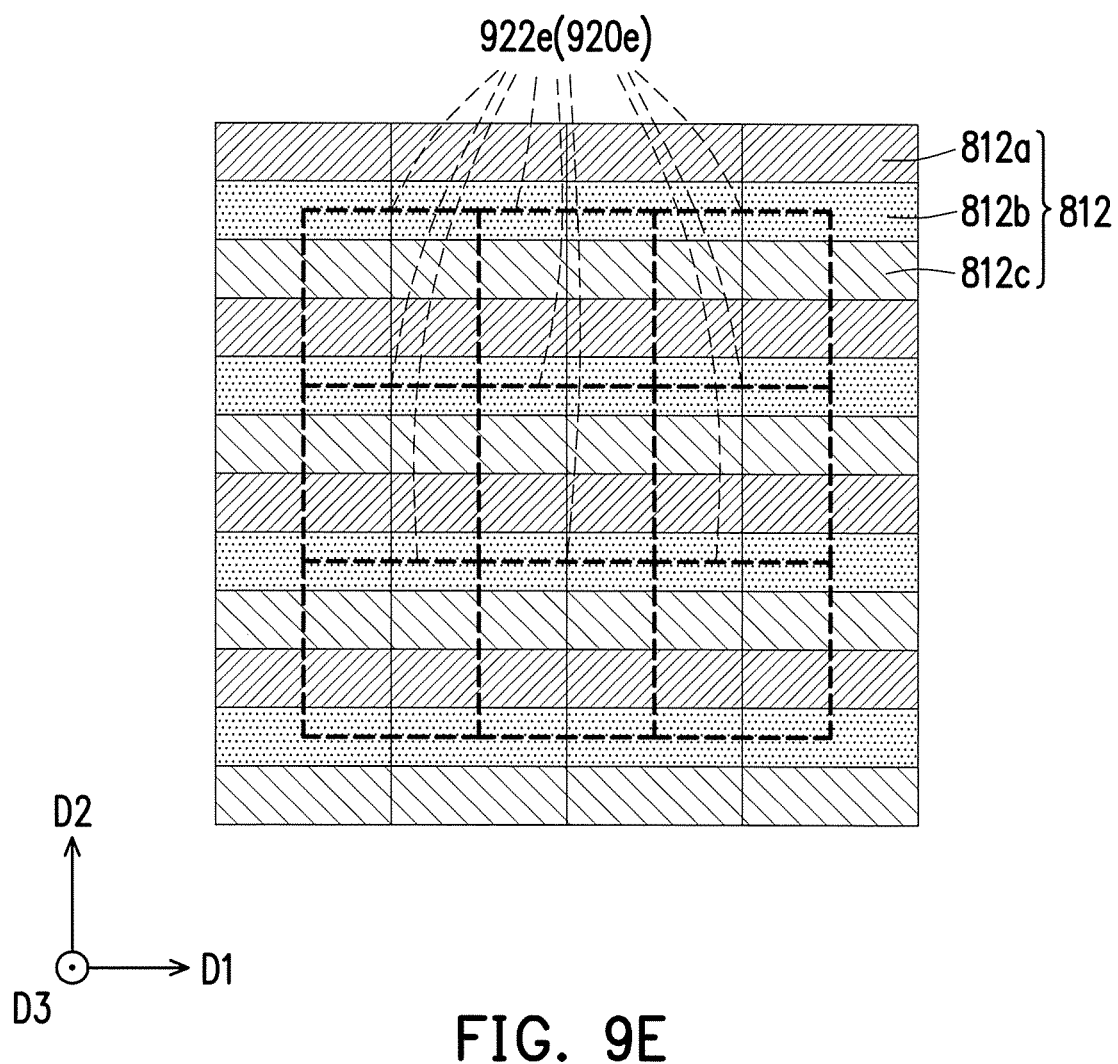

In FIG. 9B, in the embodiment, the space of one pixel 812 can accommodate four liquid crystal units 922*b* of the liquid crystal layer 920*b*. In FIG. 9C, the positions of the pixels 812 and the positions of the liquid crystal units 922*c* of the liquid crystal layer 920*c* are dislocated from one another in the first direction D1. Moreover, FIG. 9D shows the relationship between the positions of a plurality of liquid crystal units 922*d* of a liquid crystal layer 920*d* and the pixels 812, wherein each of the liquid crystal units 922*d* can cover a plurality of sub-pixels, and FIG. 9E also shows the relationship between the positions of a plurality of liquid crystal units 922*e* of a liquid crystal layer 920*e* and the pixels 812. Specifically, the relationship between the positions of the liquid crystal units and the pixels 812 can be designed based on actual display requirements, and the invention is not limited thereto.

Figure 9F:
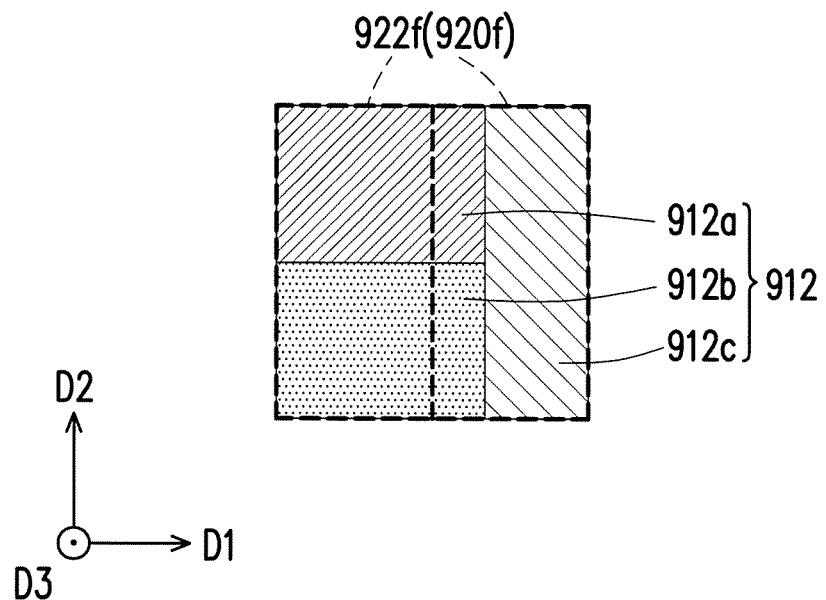
Figure 9G:
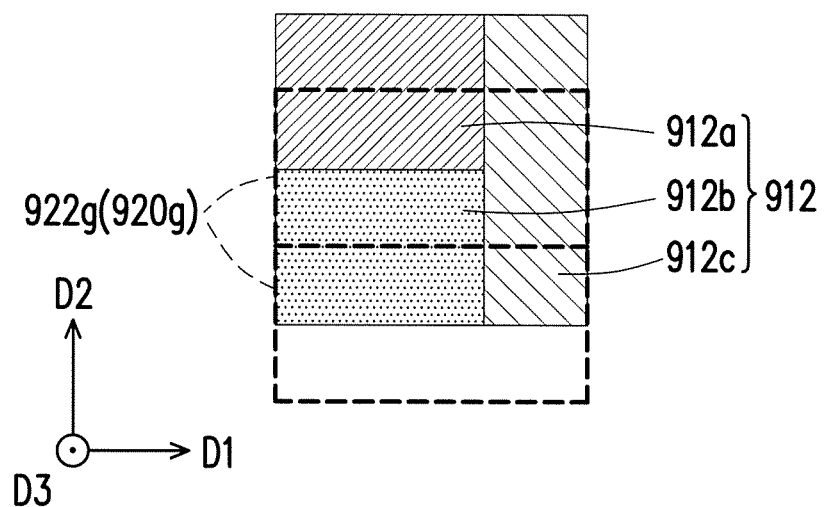
Figure 9H:
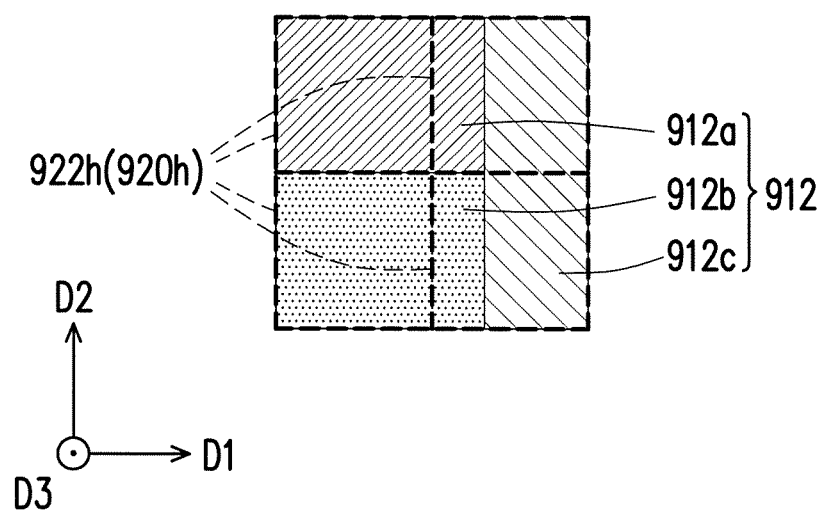

Moreover, please refer to FIG. 9F to FIG. 9H. In the embodiments of FIG. 9F to FIG. 9H, the pixels 912 include a sub-pixel 912*a*, a sub-pixel 912*b*, and a sub-pixel 912*c*. Moreover, the size and arrangement method of the sub-pixels 912*a*, 912*b*, and 912*c* of the pixels 912 are different from those of the sub-pixels 812*a*, 812*b*, and 812*c* of the pixels 812 of the embodiments of FIG. 9A to FIG. 9E. Specifically, FIG. 9F shows the relationship between the positions of a plurality of liquid crystal units 922*f* of a liquid crystal layer 920*f* and the pixels 912, FIG. 9G shows the relationship between the positions of a plurality of liquid crystal units 922*g* of a liquid crystal layer 920*g* and the pixels 912, and FIG. 9H shows the relationship between the positions of a plurality of liquid crystal units 922*h* of a liquid crystal layer 920*h* and the pixels 912. Specifically, pixels having different sub-pixel sizes and sub-pixel arrangements can be used as the pixels of the display panel based on actual display requirements. Moreover, the desired display effect is achieved by designing the relationship between the positions of the liquid crystal units and the pixels, and the invention is not limited thereto.

Figure 10:
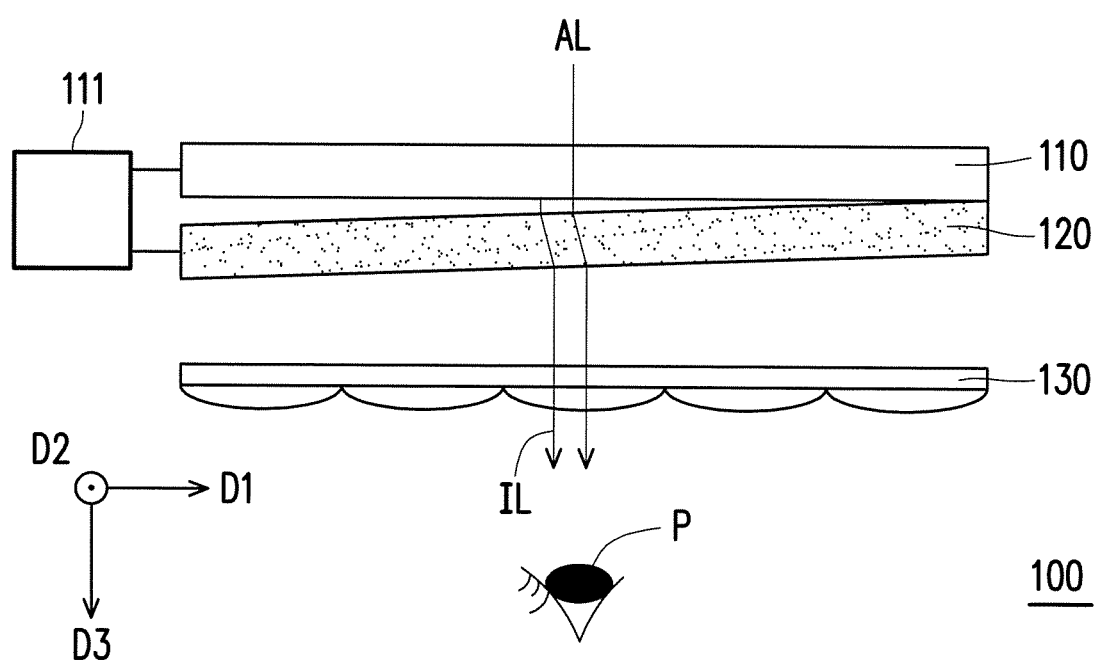
FIG. 10 shows a side view of the near-eye display device of another embodiment of the invention.

FIG. 10 shows a top view of the near-eye display device of another embodiment of the invention. In the embodiment, a near-eye display device 100' includes a display panel 110, a liquid crystal layer 120, a lens element 130, and a processor 111. The near-eye display device 100' of the embodiment is similar to the near-eye display device 100 of the embodiment of FIG. 1A, and the same elements are represented by the same reference numerals and are not repeated herein. The difference between the near-eye display device 100' and the near-eye display device 100 is that the near-eye display device 100' further includes the processor 111. The processor 111 of the near-eye display device 100' is electrically connected to the display panel 110 and the liquid crystal layer 120. The processor 111 receives the default image information provided by an image source (not shown), wherein the image information can include static pictures, motion pictures, or flat pictures or three-dimensional pictures. The processor 111 generates a control signal corresponding to the default image information based on the default image information to control the display panel 110 to provide the image light beam IL.

In an embodiment of the invention, the processor 111 is electrical connected to the liquid crystal layer 120. An adjustment device (not shown) can be electrically connected to the processor 111, and the adjustment device includes a distance sensor (such as a laser sensor) (not shown) or an operation interface (a button or a knob, not shown), and the user can perform manual adjustment via the operation interface. The adjustment device obtains the required resolution or the corresponding adjustment signal of the dimension and provides the adjustment signal to the processor 111. Via the computation of the processor 111, the processor 111 provides the required voltage value to the liquid crystal layer 120 to change the optical properties such as the refractive index of the image light beam IL so as to obtain an image having a high resolution, and the invention is not limited thereto. In another embodiment, the voltage value needed for the liquid crystal layer 120 can be provided independently by another processor, and the invention is not limited thereto. In particular, in the embodiment, the image source is, for instance, a portable electronic device capable of independent operation such as a smart phone, a tablet computer, a personal digital assistant (PDA), or a notebook computer, or an electronic device having the function of providing image content such as an intelligent robot, a central control system, a cloud server control center, or a desktop computer, and the invention is not limited thereto. In the embodiment, the processor 111 respectively includes, for instance, a central processing unit (CPU), a microprocessor, a scalar of image size, a digital signal processor (DSP), a programmable controller, a programmable logic device (PLD), or other similar devices or a combination of the devices, and the invention is not limited thereto.

Based on the above, the embodiments of the invention have at least one of the following advantages or efficacies. In an embodiment of the invention, the liquid crystal layer of the near-eye display device is disposed adjacent to the display panel, and the liquid crystal layer is disposed between the display panel and the lens element. Moreover, the image light beam provided by the display panel passes through the liquid crystal layer, and phase modulation occurs to at least a portion of the liquid crystal layer to modulate the image light beam. Therefore, the liquid crystal layer can adjust the position of the image corresponding to the display panel via the modulation to the image light beam, such that the position of the adjusted image is displaced compared to the position of the image before adjustment. By continuously adjusting the position of the image via the liquid crystal layer at different time points, when the user sees the positions of the image before and after adjustment at different time points, the user sees an image having a high resolution synthesized by the image before adjustment and the image after adjustment. Therefore, the near-eye display device of an embodiment of the invention has high resolution compared to existing near-eye display devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A near-eye display device, comprising:
   a display panel;
   a lens element; and
   a liquid crystal layer disposed adjacent to the display panel and disposed between the display panel and the lens element, wherein the display panel is configured to provide an image light beam to pass through the liquid crystal layer, and at least a portion of the liquid crystal layer is configured to modulate the image light beam according to phase modulation,
   wherein the lens element is a micro lens array.

2. The near-eye display device of claim 1, wherein the display panel is a transparent display panel, the image light beam passes through the liquid crystal layer and the lens element in order, and an ambient light beam passes through the display panel, the liquid crystal layer, and the lens element in order.

3. The near-eye display device of claim 1, wherein the display panel comprises a plurality of pixels arranged in an array along a first direction and a second direction perpendicular to the first direction, the liquid crystal layer has a first angle of inclination on a plane formed by the first direction and a third direction relative to the display panel, phase modulation occurs to the liquid crystal layer such that the image light beam passing through the liquid crystal layer generates a first displacement in the first direction, and the first displacement is less than or equal to a pixel width of one of the pixels in the second direction.

4. The near-eye display device of claim 1, wherein the display panel comprises a plurality of pixels arranged in an array along a first direction and a second direction perpendicular to the first direction, the liquid crystal layer comprises a first sub-liquid crystal layer and a second sub-liquid crystal layer stacked on top of each other, the first sub-liquid crystal layer has a first angle of inclination in the first direction relative to the display panel, phase modulation occurs to the first sub-liquid crystal layer such that an image light beam passing through the first sub-liquid crystal layer generates a first displacement in the first direction, the first displacement is less than or equal to a pixel width of one of the pixels in the second direction, the second sub-liquid crystal layer has a second angle of inclination in the second direction relative to the display panel, phase modulation occurs to the second sub-liquid crystal layer such that the image light beam passing through the second sub-liquid crystal layer generates a second displacement in the second direction, and the second displacement is less than or equal to a pixel width of one of the pixels in the first direction.

5. A near-eye display device, comprising:
   a display panel;
   a lens element; and
   a liquid crystal layer disposed adjacent to the display panel and disposed between the display panel and the lens element, wherein the display panel is configured to provide an image light beam to pass through the liquid crystal layer, and at least a portion of the liquid crystal layer is configured to modulate the image light beam according to phase modulation,
   wherein the liquid crystal layer further comprises an optical microstructure layer, the optical microstructure layer is located between the lens element and the display panel, the optical microstructure layer comprises a plurality of optical microstructures facing the display panel and disposed in an array, and each of the optical microstructures comprises an inclined surface inclined relative to the display panel.

6. The near-eye display device of claim 5, wherein the liquid crystal layer further comprises a first substrate, a second substrate, and a liquid crystal material, and the liquid crystal material is filled between the first substrate and the second substrate.

7. The near-eye display device of claim 6, wherein the optical microstructure layer is disposed on the first substrate and located between the first substrate and the second substrate, and the liquid crystal material covers the inclined surfaces of the optical microstructures and are aligned on the inclined surfaces.

8. The near-eye display device of claim 6, wherein the optical microstructure layer is disposed on the second substrate and located between the second substrate and the display panel, and a material of the optical microstructures has biconic properties.

9. The near-eye display device of claim 5, wherein the display panel comprises a plurality of pixels arranged in an array along a first direction and a second direction perpendicular to the first direction, each of the inclined surfaces has a first angle of inclination in the first direction relative to the display panel, phase modulation occurs to the liquid crystal layer such that the image light beam passing through the liquid crystal layer generates a first displacement in the first direction, and the first displacement is less than or equal to a pixel width of one of the pixels in the second direction.

10. The near-eye display device of claim 9, wherein each of the inclined surfaces has a second angle of inclination in the second direction relative to the display panel, phase modulation occurs to the liquid crystal layer such that the image light beam passing through the liquid crystal layer generates a second displacement in the second direction, and the second displacement is less than or equal to a pixel width of one of the pixels in the first direction.

11. A near-eye display device, comprising:
a display panel;
a lens element; and
a liquid crystal layer disposed adjacent to the display panel and disposed between the display panel and the lens element, wherein the display panel is configured to provide an image light beam to pass through the liquid crystal layer, and at least a portion of the liquid crystal layer is configured to modulate the image light beam according to phase modulation,
wherein the display panel comprises a plurality of pixels arranged in an array along a first direction and a second direction perpendicular to the first direction, the liquid crystal layer comprises a plurality of liquid crystal units arranged in an array along the first direction and the second direction, and phase modulation occurs to at least a portion of the liquid crystal units to modulate at least a portion of the image light beam.

12. The near-eye display device of claim 11, wherein a width of each of the liquid crystal units in the first direction is less than or equal to a pixel width of one of the pixels in the second direction, and a width of each of the liquid crystal units in the second direction is less than or equal to a pixel width of one of the pixels in the first direction.

13. The near-eye display device of claim 11, wherein each of the pixels in at least a portion of the pixels corresponds to at least two of the liquid crystal units, phase modulation occurs to at least a portion of the liquid crystal units corresponding to one of the pixels at a first time point to modulate the image light beam, and phase modulation occurs to at least another portion of the liquid crystal units corresponding to the pixel at a second time point to modulate the image light beam.

14. The near-eye display device of claim 11, wherein each of the pixels comprises a plurality of sub-pixels, and each of the liquid crystal units at least partially covers at least one of the sub-pixels.

15. The near-eye display device of claim 11, wherein positions of the pixels and positions of the liquid crystal units are dislocated from one another.

16. A near-eye display device, comprising:
a display panel;
a lens element; and
a liquid crystal layer disposed adjacent to the display panel and disposed between the display panel and the lens element, wherein the display panel is configured to provide an image light beam to pass through the liquid crystal layer, and at least a portion of the liquid crystal layer is configured to modulate the image light beam according to phase modulation,
wherein the lens element is configured to converge the image light beam passing through the liquid crystal layer such that the image light beam enters a pupil.

17. A near-eye display device, comprising:
a display panel;
a lens element; and
a liquid crystal layer disposed adjacent to the display panel and disposed between the display panel and the lens element, wherein the display panel is configured to provide an image light beam to pass through the liquid crystal layer, and at least a portion of the liquid crystal layer is configured to modulate the image light beam according to phase modulation,
wherein the display panel comprises a plurality of pixels arranged in an array along a first direction and a second direction perpendicular to the first direction, the liquid crystal layer has a first angle of inclination on a plane fonned by the first direction and a third direction relative to the display panel, phase modulation occurs to the liquid crystal layer such that the image light beam passing through the liquid crystal layer generates a first displacement in the first direction, and the first displacement is less than or equal to a pixel width of one of the pixels in the second direction, and
wherein the liquid crystal layer has a second angle of inclination on a plane formed by the second direction and the third direction relative to the display panel, phase modulation occurs to the liquid crystal layer such that the image light beam passing through the liquid crystal layer generates a second displacement in the second direction, and the second displacement is less than or equal to a pixel width of one of the pixels in the first direction.

* * * * *